United States Patent
Ide

(10) Patent No.: US 11,295,455 B2
(45) Date of Patent: Apr. 5, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Naoki Ide, Tokyo (JP)

(73) Assignee: SONY CORPORATION, Tokyo (JP)

( * ) Notice: Subject to any disclaimer, the term of this patent is extended or adjusted under 35 U.S.C. 154(b) by 258 days.

(21) Appl. No.: 16/471,127

(22) PCT Filed: Aug. 14, 2018

(86) PCT No.: PCT/JP2018/030270
§ 371 (c)(1),
(2) Date: Jun. 19, 2019

(87) PCT Pub. No.: WO2019/097784
PCT Pub. Date: May 23, 2019

(65) Prior Publication Data
US 2020/0034977 A1 Jan. 30, 2020

(30) Foreign Application Priority Data

Nov. 16, 2017 (JP) .............................. JP2017-221008

(51) Int. Cl.
*G06T 7/246* (2017.01)
*G06K 9/62* (2006.01)
*G06N 3/08* (2006.01)

(52) U.S. Cl.
CPC ............ *G06T 7/246* (2017.01); *G06K 9/6256* (2013.01); *G06K 9/6267* (2013.01); *G06N 3/08* (2013.01); *G06T 2207/20081* (2013.01)

(58) Field of Classification Search
CPC .......... G06T 7/246; G06T 2207/20081; G06T 2207/10016; G06T 2207/20084; G06T 2207/30196; G06T 2207/30232; G06T 2207/30241; G06K 9/6256–6267; G06K 9/00671–00718; G06K 2009/3291;
(Continued)

(56) References Cited

U.S. PATENT DOCUMENTS 9,158,971 B2 * 10/2015 Gaidon .............. G06K 9/00711
10,423,892 B2 * 9/2019 Xu ........................ G06K 9/6212
(Continued)

OTHER PUBLICATIONS

Watters et al., Visual Interaction Networks, arxiv.org, Cornell University Library, Jun. 5, 2017, pp. 1-14, XP080767629, Cornell University, Ithaca, NY.

*Primary Examiner* — Michael S Osinski
(74) *Attorney, Agent, or Firm* — Paratus Law Group, PLLC

(57) ABSTRACT

There is provided an information processing apparatus to reduce the burden of label assignment and achieve learning that is more flexible, the information processing apparatus including: a learning unit configured to perform machine learning using training data to which a constraint label is assigned. The constraint label is a label in which a type of constraint that a normal label is to follow is defined. In addition, there is provided an information processing method including: performing, by a processor, machine learning using training data to which a constraint label is assigned. The constraint label is a label in which a type of constraint that a normal label is to follow is defined.

19 Claims, 22 Drawing Sheets

(58) Field of Classification Search
CPC ... G06K 9/6254–6267; G06K 9/00744; G06K 9/00771; G06K 9/00342; G06K 9/00805; G06K 9/00348; G06K 9/00677; G06K 9/00751; G06N 3/0454–088
See application file for complete search history.

(56) References Cited

U.S. PATENT DOCUMENTS

| | | | | |
|---|---|---|---|---|
| 10,580,179 | B2* | 3/2020 | Luan | H04N 21/4666 |
| 2011/0052002 | A1* | 3/2011 | Cobb | G06K 9/00771 |
| | | | | 382/103 |
| 2013/0243252 | A1* | 9/2013 | Xu | G06K 9/00369 |
| | | | | 382/103 |
| 2014/0328570 | A1* | 11/2014 | Cheng | H04N 21/44008 |
| | | | | 386/241 |
| 2015/0243038 | A1* | 8/2015 | Zhao | G06T 7/254 |
| | | | | 382/103 |
| 2015/0248586 | A1 | 9/2015 | Gaidon et al. | |
| 2015/0286874 | A1* | 10/2015 | Burghouts | G06K 9/52 |
| | | | | 382/103 |
| 2016/0189009 | A1* | 6/2016 | Tran | G06N 3/0454 |
| | | | | 382/158 |
| 2017/0243083 | A1* | 8/2017 | Wang | G06K 9/6262 |
| 2017/0293805 | A1* | 10/2017 | Kontschieder | G06N 5/00 |
| 2018/0007382 | A1* | 1/2018 | Pio | G06N 3/084 |
| 2018/0136332 | A1* | 5/2018 | Barfield, Jr | G06T 7/70 |
| 2018/0218203 | A1* | 8/2018 | Lawson | G06K 9/00348 |
| 2018/0373943 | A1* | 12/2018 | Tanigawa | G06K 9/6256 |
| 2018/0373980 | A1* | 12/2018 | Huval | G06K 9/00805 |
| 2019/0042850 | A1* | 2/2019 | Jones | G06K 9/00711 |
| 2019/0073538 | A1* | 3/2019 | Ashani | G06F 16/5854 |
| 2019/0080176 | A1* | 3/2019 | Lan | G06N 3/0454 |
| 2019/0114487 | A1* | 4/2019 | Vijayanarasimhan | |
| | | | | G06K 9/00751 |
| 2019/0129436 | A1* | 5/2019 | Sun | G06N 7/005 |
| 2019/0156202 | A1* | 5/2019 | Falk | G06N 3/0454 |
| 2019/0244366 | A1* | 8/2019 | Yu | G06N 5/046 |
| 2019/0392318 | A1* | 12/2019 | Ghafoor | G06K 9/6256 |
| 2020/0057935 | A1* | 2/2020 | Wang | G06N 3/084 |
| 2020/0074227 | A1* | 3/2020 | Lan | G06K 9/00342 |
| 2020/0117907 | A1* | 4/2020 | Li | G06K 9/00771 |
| 2020/0242402 | A1* | 7/2020 | Jung | G06K 9/6232 |
| 2020/0257902 | A1* | 8/2020 | Yao | G06K 9/46 |
| 2020/0348678 | A1* | 11/2020 | Sun | G05D 1/0088 |
| 2020/0410691 | A1* | 12/2020 | Brosch | G06T 7/12 |
| 2021/0064925 | A1* | 3/2021 | Shih | G06K 9/6256 |

* cited by examiner

FIG. 5

|  | REGRESSION | CLASSIFICATION |
|---|---|---|
| NORMAL LABEL | CONTINUOUS VALUE (SUCH AS COORDINATE) | DISCRETE VALUE (CLASS) |
| CONSTRAINT LABEL | DISCRETE VALUE (MOVEMENT TYPE) | DISCRETE VALUE (CATEGORY) |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2018/030270 (filed on Aug. 14, 2018) under 35 U.S.C. § 371, which claims priority to Japanese Patent Application No. 2017-221008 (filed on Nov. 16, 2017), which are all hereby incorporated by reference in their entirety.

TECHNICAL FIELD

The present disclosure relates to an information processing apparatus, an information processing method, and a program.

BACKGROUND ART

Various techniques for performing estimation or prediction based on collected information have been recently developed. An example of techniques as described above includes object detection techniques based on images or sensor information. In addition, there is also known an approach to perform learning relating to object detection from data regardless of design by human. In one example, Non-Patent Literature 1 or Non-Patent Literature 2 discloses a technique for generating an object detector using deep learning.

CITATION LIST

Non-Patent Literature

Non-Patent Literature 1: "Fully-Convolutional Siamese Networks for Object Tracking", by Luca Bertinetto and four others, submitted on 30 Jun. 2016, available at http URL (https://arxiv.org/abs/1606.09549v1) searched at 13 Nov. 2017

Non-Patent Literature 2: "Label-Free Supervision of Neural Networks with Physics and Domain Knowledge", by Russell Stewart and one other, submitted on 18 Sep. 2016, available at http URL (https://arxiv.org/abs/1609.05566) searched at 13 Nov. 2017

DISCLOSURE OF INVENTION

Technical Problem

However, the technique disclosed in Non-Patent Literature 1 requires a large amount of labor for assigning a teacher label to a moving image, and the technique disclosed in Non-Patent Literature 2 is difficult to cope with multiple movements of the detection target by one-time learning.

In view of this, the present disclosure develops a novel and improved information processing apparatus, information processing method, and program, capable of reducing the burden of label assignment and achieving learning that is more flexible.

Solution to Problem

According to the present disclosure, there is provided an information processing apparatus including: a learning unit configured to perform machine learning using training data to which a constraint label is assigned. The constraint label is a label in which a type of constraint that a normal label is to follow is defined.

In addition, according to the present disclosure, there is provided an information processing method including: performing, by a processor, machine learning using training data to which a constraint label is assigned. The constraint label is a label in which a type of constraint that a normal label is to follow is defined.

In addition, according to the present disclosure, there is provided a program causing a computer to function as an information processing apparatus including: a learning unit configured to perform machine learning using training data to which a constraint label is assigned. The constraint label is a label in which a type of constraint that a normal label is to follow is defined.

Advantageous Effects of Invention

According to the present disclosure as described above, it is possible to reduce the burden of label assignment and achieve learning that is more flexible.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrated to describe a label abstraction level according to the present embodiment.

MODE(S) FOR CARRYING OUT THE INVENTION

Figure 1:
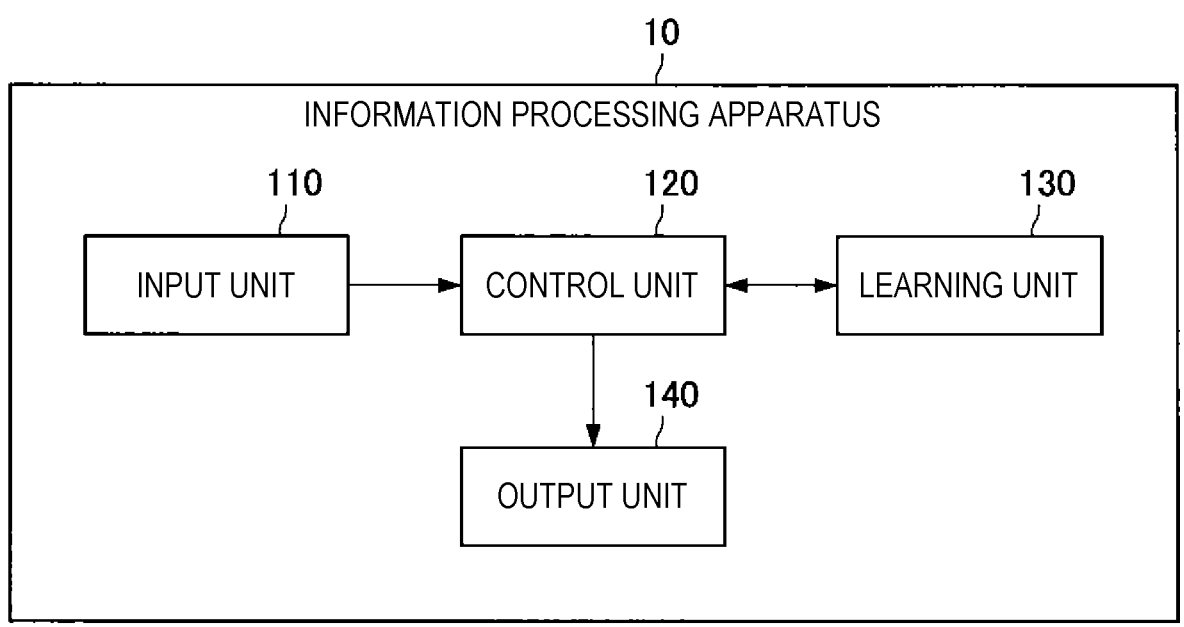
FIG. 1 is a block diagram illustrating an example of a functional configuration of an information processing apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description is given in the following order.
1. First Embodiment
1.1. Overview
1.2. Functional configuration example of information processing apparatus 10
1.3. Learning using constraint label
1.4. Detailed example of learning target
2. Hardware configuration example
3. Concluding remarks

1. FIRST EMBODIMENT

<<1.1. Overview>>

An overview of an embodiment of the present disclosure is now described. As described above, in recent years, various techniques for performing estimation or prediction based on collected information have been developed. Such techniques include, in one example, a wide variety of estimation techniques for continuous values such as object detection, position estimation, or sensor value estimation. In addition, a technique for implementing estimation as described above using machine-learning approaches such as deep learning is also known.

In one example, Non-Patent Literature 1 discloses an approach to generate a tracker that tracks an object (detection target) using deep learning. In a case of generating a tracker using deep learning as the technique disclosed in Non-Patent Literature 1, it is possible to capture appropriately, in one example, a change in appearance of a detection target or a change in situation such as being hidden in the shadow from statistical information of training data.

In the generation of a tracker using deep learning as the technique disclosed in Non-Patent Literature 1, the supervised learning using a training dataset in which data and a teacher label are paired is typically performed. In this case, the above-mentioned data is, in one example, each frame image in a moving image, and the teacher label is the position of a detection target in each frame image.

Figure 22:
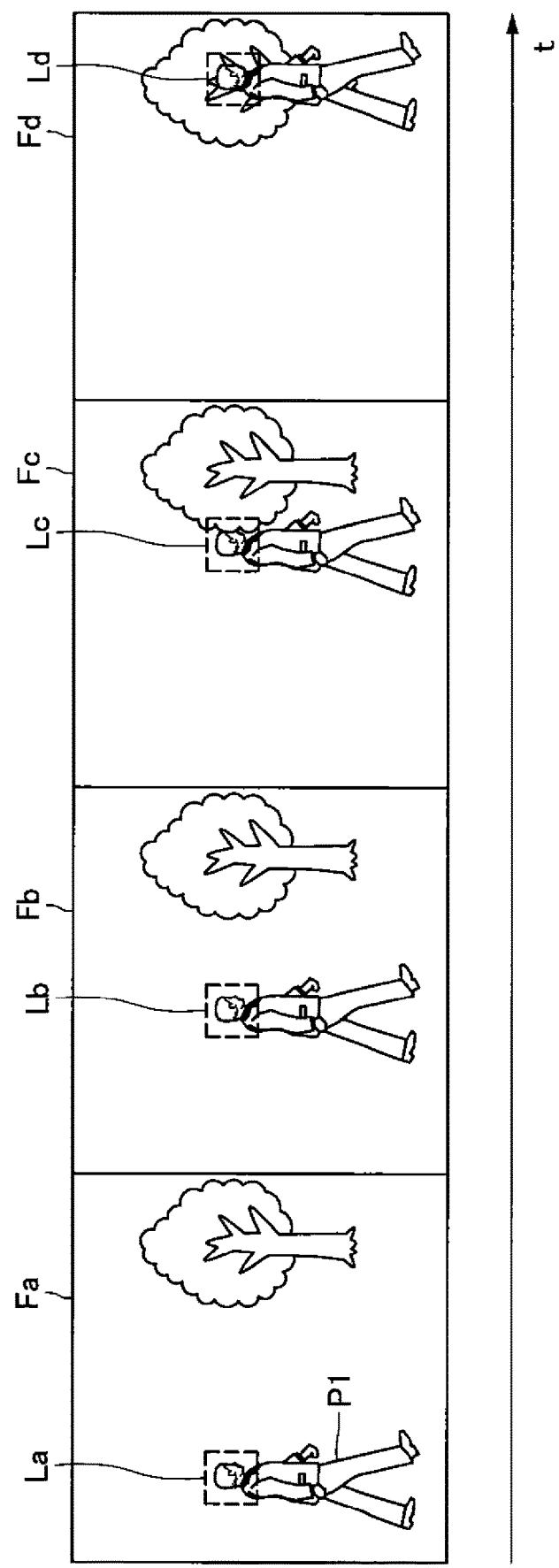
FIG. 22 is a diagram illustrated to describe assignment of a teacher label by a comparative approach 1.

FIG. 22 is a diagram illustrated to describe assignment of a teacher label by a comparative approach 1 according to an embodiment of the present disclosure. The comparative approach 1 described above is an approach of generating a tracker using training data to which a teacher label is assigned. In the comparative approach 1, it is necessary to assign a teacher label to each of the frame images that constitute the moving image. In the example illustrated in FIG. 22, teacher labels La to Ld are respectively assigned to the positions of the face of a detection target P1 in frame images Fa to Fd.

However, in many cases, a person who examines each frame image one by one assigns a teacher label as described above. In one example, in a case where a teacher label is assigned to a 30-minute moving image (30 fps), the number of teacher labels is 30 (frame)×60 (seconds)×30 (minutes)=54000, and so the labor for assigning the teacher label increases.

Thus, in the generation of a tracker using the learning approach as disclosed in Non-Patent Literature 1, the burden for securing sufficient training data is very large, resulting in difficulty to improve tracking performance.

On the other hand, in Non-Patent Literature 2, in a case where an action of the detection target is subject to a specific physical law, it is reported that learning by unlabeled teaching can be implemented without assigning a teacher label by using constraint imposed by the physical law.

Figure 23:
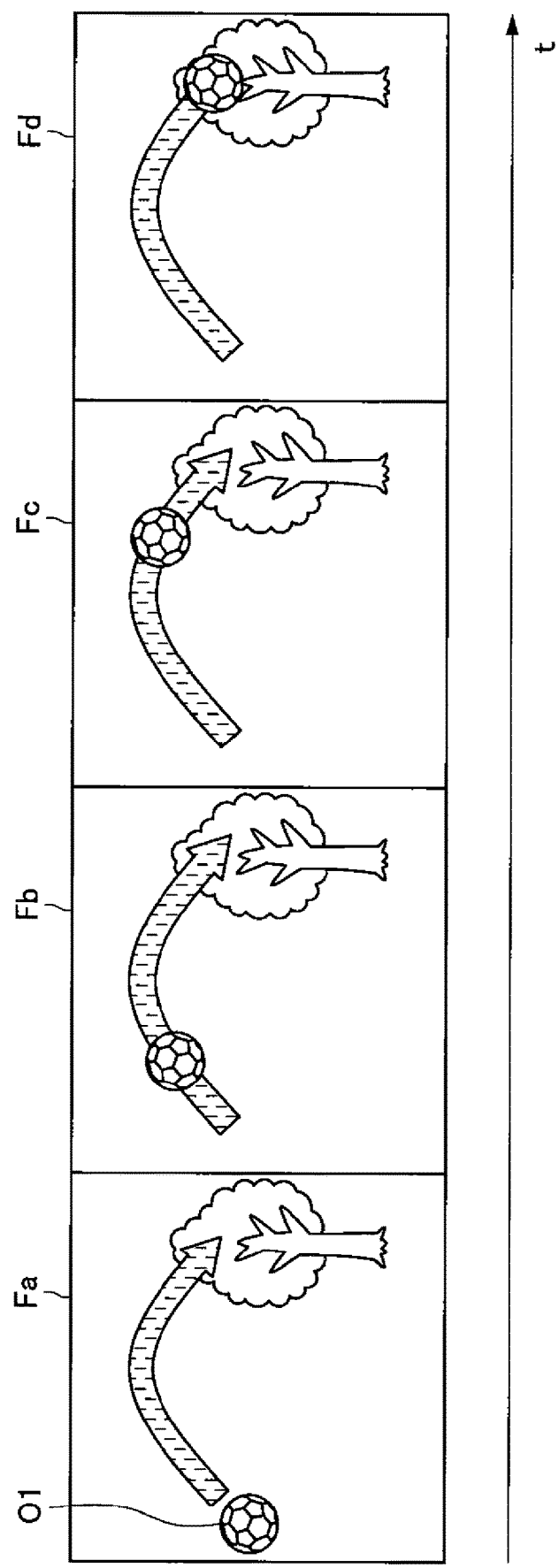
FIG. 23 is a diagram illustrated to describe unlabeled teaching learning by a comparative approach 2.

FIG. 23 is a diagram illustrated to describe unlabeled teaching learning by a comparative approach 2 according to an embodiment of the present disclosure. In one example, as illustrated in FIG. 23, in the moving image including frame images Fa to Fd, a change in positions of a detection target O1 released into the air follows a parabolic trajectory. In this case, it is possible to fit the change in positions of the detection target O1 using a quadratic function with the initial velocity and the initial position of the detection target O1 as unknown parameters.

As described above, in the unlabeled teaching according to the comparative approach 2, it is possible to obtain the performance equivalent to the teacher labeled learning without assigning the teacher label by using the constraint of the physical law relating to the action of the detection target.

However, in the comparative approach 2, only one type of constraint, that is, only an action that follows one physical law can cope with in one-time learning. For this reason, it is difficult to cope with a change in actions of the detection target not falling under the constraint described above or the change in situation such as being hidden in the shadow. Thus, it is necessary to collect a large amount of training data subject to the same constraint to further improve the learning performance.

The technical idea according to an embodiment of the present disclosure is conceived focusing on the above-described point, and it is possible to learn a plurality of action types of a detection target in one-time learning while significantly reducing the burden of assignment of a teacher label. To this end, the information processing apparatus for implementing the information processing method according to the present embodiment has one feature for performing machine learning using training data to which a label (hereinafter also referred to as a constraint label) representing the type of constraint is assigned. Here, the above-mentioned constraint label may be a teacher label, that is, a label that defines the type of constraint that the normal label is to follow.

More specifically, the constraint label according to the present embodiment is a motion label in which the action type of the detection target is defined. In addition, the motion label according to the present embodiment may be, in one example, a label in which an action type that follows the physical law is defined. Here, examples of the action type that follows the physical law as described above include uniformly accelerated motion (parabolic motion), uniform motion, circular motion, or the like.

In one example, in the case of uniformly accelerated motion, the position of the detection target performing the uniformly accelerated motion in the moving image is restricted by a quadratic function of time (defined by, in one example, a frame ID, etc.).

However, in this case, the initial velocity $v_0$ and the initial position $y_0$ of the detection target are unknown, so they become positions having an unknown parameter as expressed in Formula (1) below. Here, t is a variable representing time, but is also assumed to be a frame ID of a moving image. In addition, $\lambda$ is one representing collectively unknown parameters $v_0$ and $y_0$, which will be referred to as constraint parameters. On the other hand, if a neural network is used, it is also possible to learn and acquire a function $f_\theta$ for predicting the position of the detection target from an image $x_t$ (image vector) as in Formula (2) below. Here, the parameter $\theta$ is one representing collectively learning parameters such as weight and bias of the neural network.

[Math. 1]

$$\hat{y}_t = y_0 + v_0 t + a t^2 = h(\lambda, t) \tag{1}$$

$$y_t = f_\theta(x_t) \tag{2}$$

Here, if an objective function of learning is regarded as the minimization of the square error of Formula (1) and Formula (2), the objective function can be expressed by Formula (3) below. In addition, Formula (3) can be written as Formula (4) below using the constraint parameter $\lambda$ ($v_0$, $y_0$) and the prediction function $f_\theta$. However, f, a, and A are each defined by Formula (5) below. If $v_0$ and $y_0$, which minimize L in Formula (4) are obtained and substituted into Formula (1), the position of the detection target can be expressed by Formula (6) below. In other words, the objective function can be written as a generic function of the prediction function $f_\theta$ by eliminating the constraint parameter as in Formula (7) below. Finally, the parameter $\theta$ of the neural network that minimizes L in Formula (7) is obtained using learning, so a parameter capable of predicting the position of the detection target can be obtained.

[Math. 2]

$$L = \sum_t [f_\theta(x_t) - h(\lambda, t)]^2 \tag{3}$$

$$L = \sum_i (f_\theta(x_i) - \hat{y}_i)^2 = \sum_i (f_\theta(x_i) - y_0 - v_0(i\Delta t) - a(i\Delta t)^2)^2 = \tag{4}$$

$$\left(f - a - A\begin{pmatrix} v_0 \\ y_0 \end{pmatrix}\right)^T \left(f - a - A\begin{pmatrix} v_0 \\ y_0 \end{pmatrix}\right)$$

$$f = \begin{bmatrix} f_\theta(x_1) \\ f_\theta(x_2) \\ f_\theta(x_3) \\ \ldots \end{bmatrix}, a = a\begin{bmatrix} (\Delta t)^2 \\ (2\Delta t)^2 \\ (3\Delta t)^2 \\ \ldots \end{bmatrix}, A = \begin{bmatrix} \Delta t & 1 \\ 2\Delta t & 1 \\ 3\Delta t & 1 \\ \ldots & \ldots \end{bmatrix} \tag{5}$$

$$\hat{y} = a + A(A^T A)^{-1} A^T (f - a) \tag{6}$$

$$L = \sum_t [f_\theta(x_t) - h(\lambda(f_\theta(x_t)), t)]^2 \tag{7}$$

Further, in the case of uniform motion, the position of the detection target performing walking or the like in the moving image is restricted by being represented by a linear function of time (defined by, in one example, a frame ID, etc.).

In this case, it is sufficient if the accelerated motion term is removed from the uniformly accelerated motion described above and a constraint for avoiding the solution of velocity 0 expressed in Formula (8) and the solution of velocity ∞ expressed in Formula (9) is added.

[Math. 3]

$$h_1(x) = -\text{std}(f_\theta(x)) \tag{8}$$

$$h_2(x) = \max(ReLU(f_\theta(x) - c_1)) + \max(ReLU(c_2 - f_\theta(x))) \tag{9}$$

Further, in the case of circular motion (periodic motion), the same can be written as above. In this event, it is possible to generate a function for predicting the position of the detection target from the image as expressed in Formula (10) using a neural network. In this event, if the objective function of learning is regarded as the minimization of the square error of two prediction functions, the relevant objective function can be represented by Formula (11) below. Moreover, unlike the uniformly accelerated motion and the uniform motion, the constraint parameter fails to be written with the prediction function $f_\theta$, so in one example, it is desirable to provide alternatives such as alternate optimization.

[Math. 4]

$$(y_t, y_t) = f(x_t, \theta) \tag{10}$$

$$L = [f(x, \theta) - h(\lambda)]^2 \tag{11}$$

The example of the constraint label according to the present embodiment is described above. According to the constraint label according to the present embodiment, it is possible to learn a plurality of action types of the detection target in one-time learning while significantly reducing the burden of assignment of the teacher label. Features of learning using the constraint label according to the present embodiment and effects achieved by the features are described below in detail. Moreover, although the following description is given of a case of generating a tracker that performs tracking of the detection target as an example, the application of the constraint label according to the present embodiment is not limited to such an example. The constraint label according to the present embodiment is widely applicable to techniques for estimating continuous values, such as object detection, position estimation, and sensor value designation.

<<1.2. Functional Configuration Example of Information Processing Apparatus 10>>

An example of the functional configuration of an information processing apparatus 10 that implements an information processing method according to an embodiment of the present disclosure is now described. FIG. 1 is a block diagram illustrating an example of the functional configuration of the information processing apparatus 10 according to the present embodiment. Referring to FIG. 1, the information processing apparatus 10 according to the present embodiment includes an input unit 110, a control unit 120, a learning unit 130, and an output unit 140.

(Input Unit 110)

The input unit 110 according to the present embodiment has a function of accepting an input operation by the user. In the input unit 110 according to the present embodiment, the input unit 110 can be implemented as, in one example, various buttons, a keyboard, a touch panel, a mouse, a switch, or the like. In addition, the input unit 110 may include a microphone or the like.

(Control Unit 120)

The control unit 120 according to the present embodiment controls the respective components included in the information processing apparatus 10. In addition, the control unit 120 may have a function of tracking a detection target using the knowledge learned by the learning unit 130.

(Learning Unit 130)

The learning unit 130 according to the present embodiment has a function of performing machine learning using training data to which a constraint label is assigned. As described above, the constraint label according to the present embodiment may be a label in which the type of constraint that a normal label is to follow is defined. Details of the function of the learning unit 130 according to the present embodiment will be described later separately.

(Output Unit 140)

The output unit 140 has a function of presenting visual information or auditory information to the user. To this end, the output unit 140 can be configured to include, in one example, a display device or a loudspeaker. Here, the above-mentioned display device may be implemented as, in one example, a cathode ray tube (CRT) display device, a liquid crystal display (LCD) device, an organic light emitting diode (OLED) device, a touch panel, a projector, or the like.

The above description is given of the example of the functional configuration of the information processing apparatus 10 according to the present embodiment. Moreover, the functional configuration described above is merely an example, and the functional configuration of the information processing apparatus 10 according to the present embodiment is not limited to such an example. The functional configuration of the information processing apparatus 10 according to the present embodiment can be flexibly deformed depending on specifications or operations.

<<1.3. Learning Using Constraint Label>>

The learning using a constraint label according to the present embodiment is now described in detail. The information processing method according to the present embodiment is capable of learning a plurality of action types of a detection target in one-time learning while significantly reducing the burden of assignment of the teacher label by performing learning using a constraint label.

Figure 2:
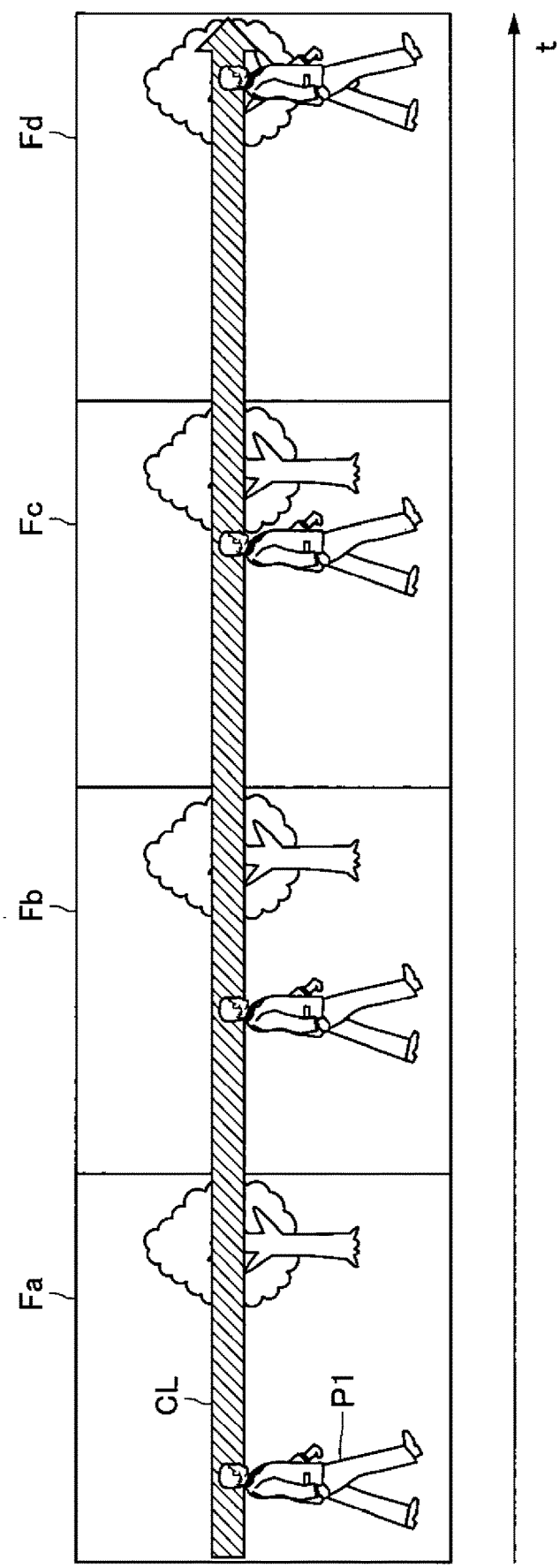
FIG. 2 is a diagram illustrated to describe an example of a constraint label according to the present embodiment.
Figure 3:
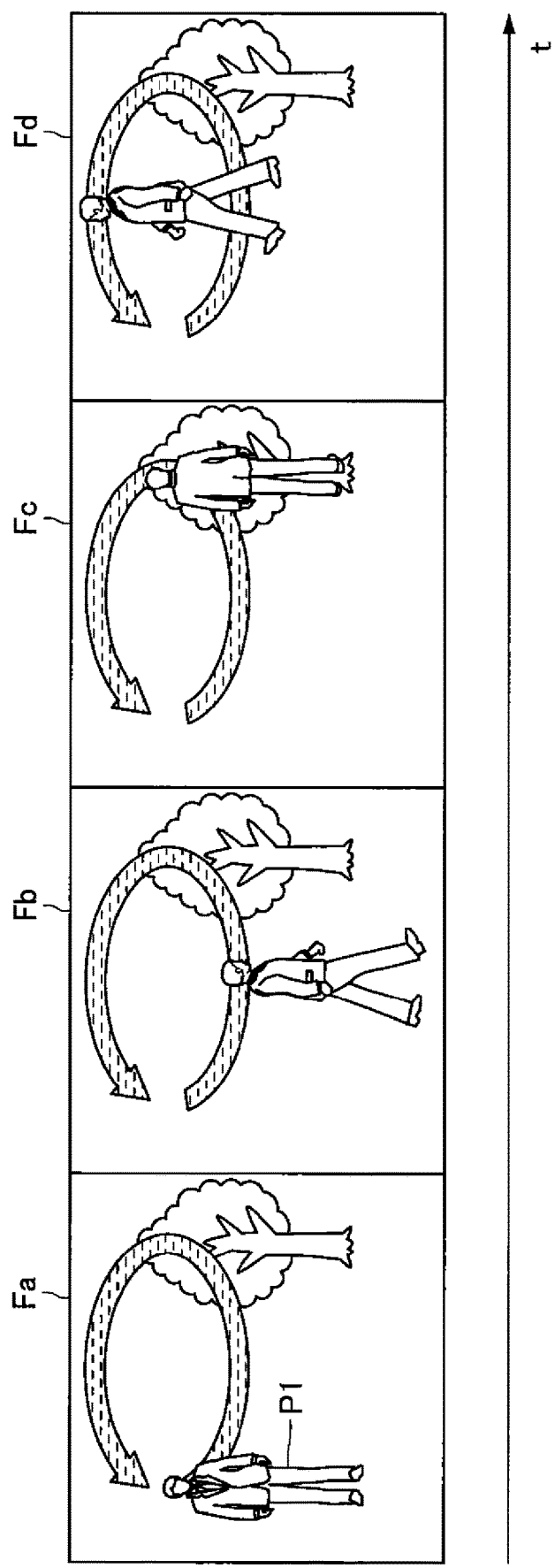
FIG. 3 is a diagram illustrated to describe an example of a constraint label according to the present embodiment.

As described above, the constraint label according to the present embodiment is a motion label in which the action type of the detection target is defined. FIGS. 2 and 3 are diagrams illustrated to describe an example of the constraint label according to the present embodiment. FIG. 2 illustrates an example of the case where a detection target P1 in a moving image including frame images Fa to Fd performs uniform motion such as walking. In this event, the learning unit 130 according to the present embodiment is capable of learning the position change of the detection target P1 without assigning a teacher label by assigning the constraint label (=uniform motion) to the frame images Fa to Fd in which the detection target P1 walks.

Further, FIG. 3 illustrates an example of a case where the detection target P1 in the moving image including the frame images Fa to Fd performs circular motion (periodic motion). In this event, the learning unit 130 according to the present embodiment is capable of learning a change in positions of the detection target P1 without assigning a teacher label by assigning the constraint label (=circular motion) to the frame images Fa to Fd in which the detection target P1 performs the circular motion.

In this way, the constraint label according to the present embodiment is a label that is collectively provided to a group having the same constraint (action type and parameter) in data such as a moving image. In other words, it can be said that the constraint label according to the present embodiment is category information relating to classification of time-series data such as a moving image.

Figure 4:
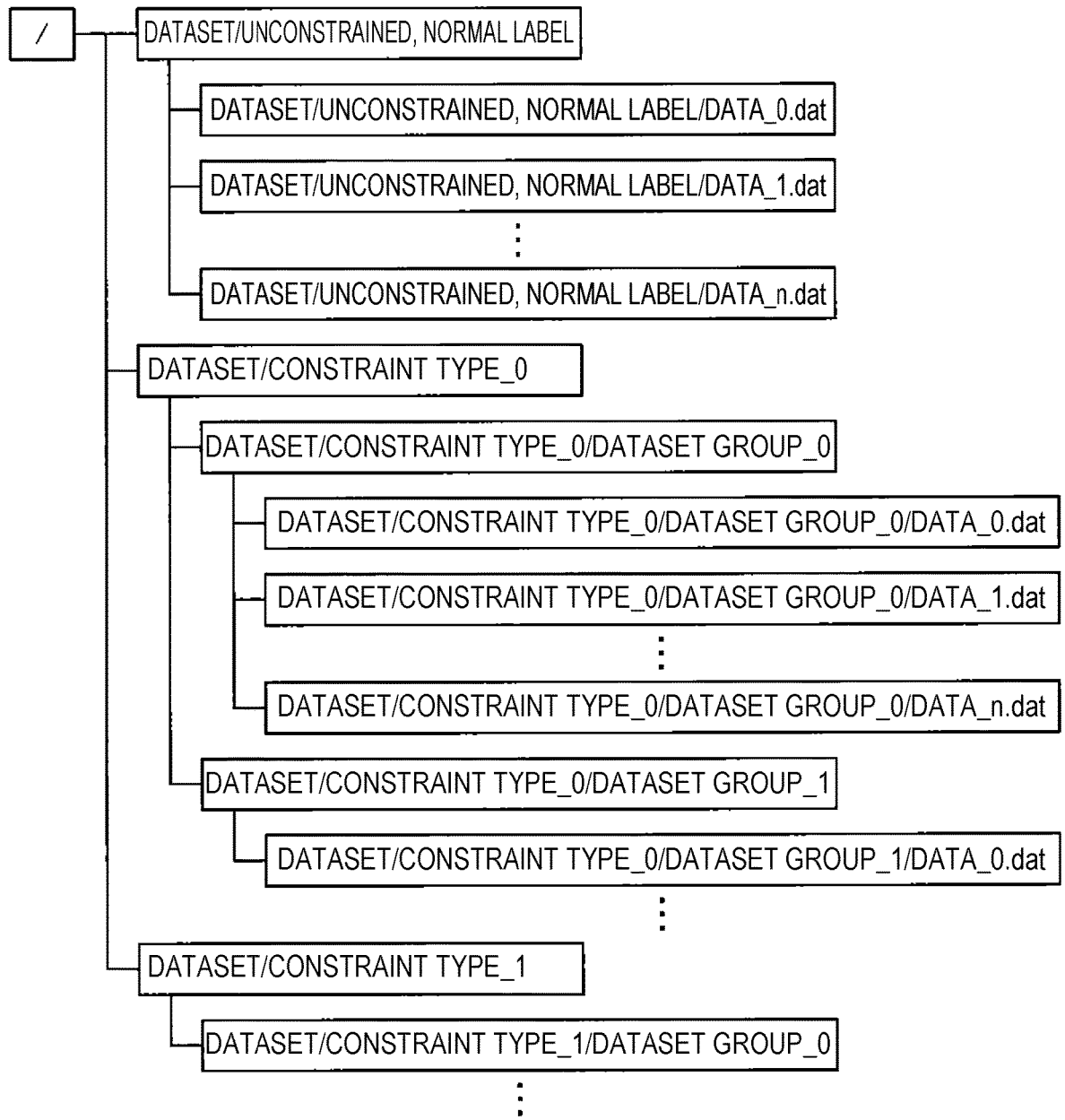
FIG. 4 is a diagram illustrating an example of the structure of a training dataset with a constraint label according to the present embodiment.

A training dataset to which a constraint label (motion label) according to the present embodiment is assigned is first described. The training dataset according to the present embodiment may have a hierarchical structure. FIG. 4 is a diagram illustrating an example of the structure of a training dataset with a constraint label according to the present embodiment. The training dataset according to the present embodiment may have, in one example, a directory hierarchical structure as illustrated in FIG. 4.

The training dataset according to the present embodiment includes an unconstrained dataset. This dataset is a dataset for performing normal supervised learning, semi-supervised learning, unsupervised learning, or the like without assigning a constraint label.

A directory associated with an unconstrained dataset may be arranged, in one example, in parallel with a group associated with other types of constraint as illustrated in FIG. 4. In addition, data may be arranged directly on a layer underlying the directory. In the example illustrated in FIG. 4, data_0.dat to data_n.dat are arranged directly under the directory.

Moreover, the lower layer structure of the directory relating to the unconstrained dataset may not necessarily be one. In one example, there may be a directory in which data is classified for each normal label, or alternatively, in the case of semi-supervised learning, time-series data may be divided and stored depending on the presence or absence of the normal label. Furthermore, it is also possible to include only unlabeled time-series data. In addition, a file or the like indicating the association (index) between the data and the label may be prepared separately for the time-series data with a normal label.

Further, the training dataset according to the present embodiment includes a constrained dataset. The dataset is used for constrained learning according to the present embodiment. The training dataset according to the present embodiment may be collected by the type of constraint as illustrated in FIG. 4.

Here, the above-mentioned constraint type indicates the action type of the detection target. In one example, the use of the above-described example allows the constraint type according to the present embodiment to include uniformly accelerated motion, uniform motion, circular motion, and the like.

Further, in the lower layer of each constraint type, a directory further grouped by a dataset group is formed. Here, the dataset group described above is set for each time-series data having the same constraint parameter (a parameter defining constraint).

Although the constraint type according to the present embodiment is described as indicating the action type, even in a case where the constraint types are the same, they have different motion characteristics in a case where the constraint parameters relating to the constraint types are different. In other words, with only the constraint type of circular motion, the action of the detection target is not uniquely determined and various circular motions can be included. Here, unique action is determined for the first time by defining constraint parameters such as an initial position or an angular velocity.

Thus, in the present embodiment, it is possible to perform highly accurate learning in which the same action is strictly defined by performing grouping for each piece of time-series data sharing the same constraint parameter.

The above description is given of the example of the structure of the training dataset according to the present embodiment. The data structure described above with reference to FIG. 4 is merely an example, and the structure of the training dataset according to the present embodiment is not limited to such an example. The training data according to the present embodiment may be grouped by assigning, in one example, an index that associates a section in time-series data such as a moving image or sensor information with constraint label and parameter. In this case, it is expected that the processing burden of dividing time-series data and arranging it in each directory is reduced and the effect of suppressing the overall data capacity is also achieved.

Subsequently, an approach to assign the constraint label according to the present embodiment is described. According to the features described above, the constraint label according to the present embodiment can be regarded as a label having an abstraction level higher than that of a normal label.

FIG. 5 is a diagram illustrated to describe the abstraction level of the label according to the present embodiment. In one example, it is easy to understand an example in which the constraint label according to the present embodiment is regarded as classifying the features of the continuous value series with respect to those representing the continuous value series.

On the other hand, even in the classification problem, the constraint label according to the present embodiment can be regarded as a category having a one-step abstraction level higher than that of a normal label. In one example, in a case where Shiba Inu, Akita Inu, and Tosa Inu are set as normal labels, dogs can be regarded as constraint labels, and Shiba Inu, Akita Inu, and Tosa Inu can be thought of as labels with different separate constraint parameters under the constraint of a dog.

Figure 6:
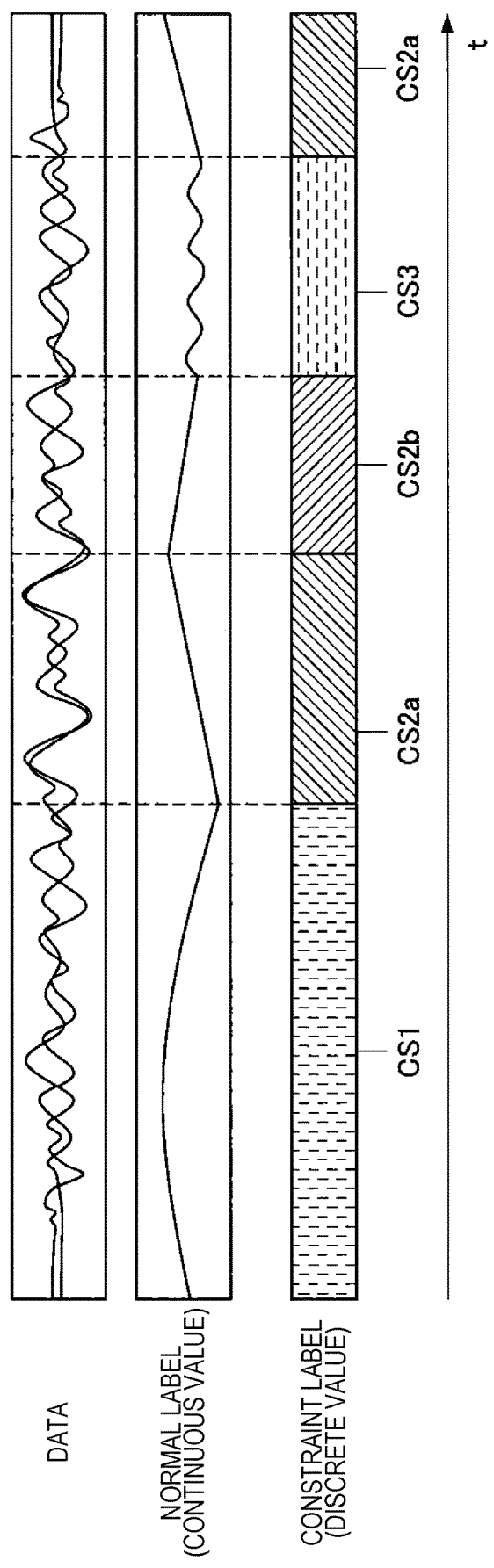
FIG. 6 is a diagram illustrated to describe the relationship between time-series data and normal and constraint labels according to the present embodiment.

The following description is given of assignment of a label in a case where normal labels are continuous value series to facilitate understanding. FIG. 6 is a diagram illustrated to describe the relationship between time-series data and normal and constraint labels according to the present embodiment.

As described above, the data illustrated in FIG. 6 is time-series data, and may be, in one example, series data such as a moving image or sensor information. In addition, the normal label is series data of continuous values, and the constraint label is series data of discrete values.

In this event, the normal label, which is series data of continuous values, in one example, is necessary to assign a continuous value to each frame image of time series, so the burden of labeling is large.

On the other hand, as illustrated in FIG. 6, it is sufficient if the beginning and the end of the section are known in the constraint labels, which are discrete values, and can be recorded, in one example, as constraint labels CS1, CS2a,
CS2b, and CS3. Thus, the amount of information is small, so it can be said that it is efficient. Moreover, even if the constraint is same, in the case where the constraint parameters are different, labeling in which differences in constraint parameters are distinguished, such as constraint labels CS2a and CS2b, may be performed.

Figure 7:
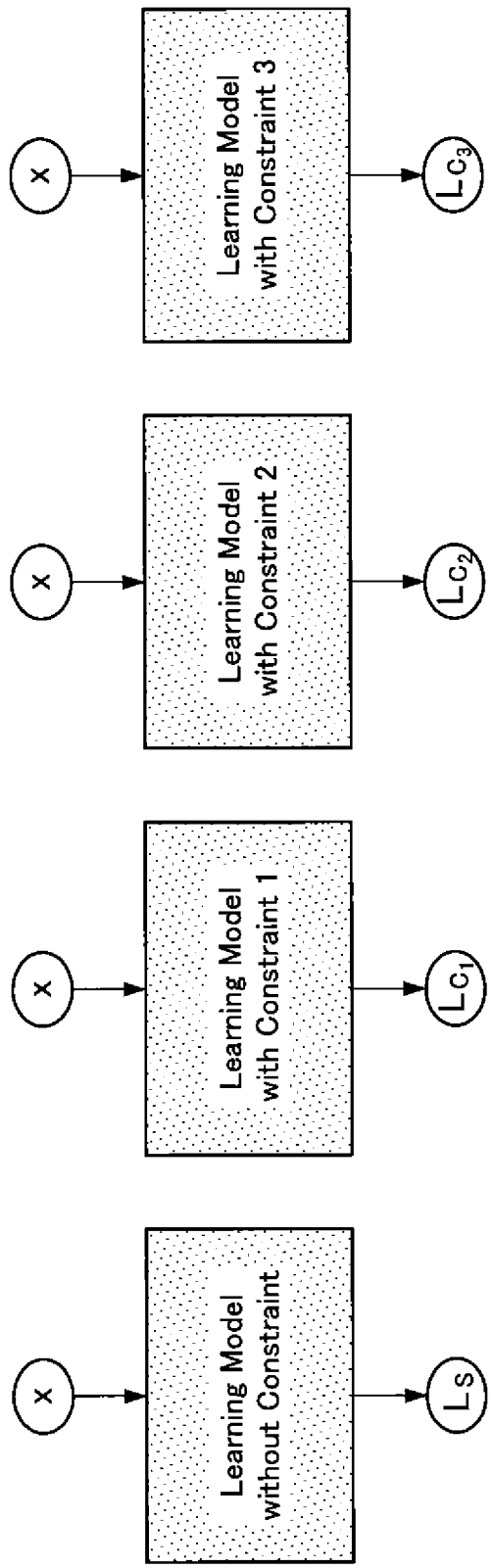
FIG. 7 is a diagram illustrating an example of a learning model corresponding to a label according to the present embodiment.

A learning model that deals with a plurality of constraint labels according to the present embodiment is subsequently described. FIG. 7 is a diagram illustrating an example of a learning model corresponding to the constraint label according to the present embodiment. FIG. 7 sequentially illustrates a learning model corresponding to no constraint label and learning models corresponding to constraint items 1 to 3 from the left.

The learning unit 130 according to the present embodiment is capable of learning a plurality of learning models by switching them as illustrated, on the basis of the constraint labels assigned to the training dataset. The learning unit 130 according to the present embodiment may select, in one example, a network or loss function relating to the learning model on the basis of the constraint label.

Figure 8:
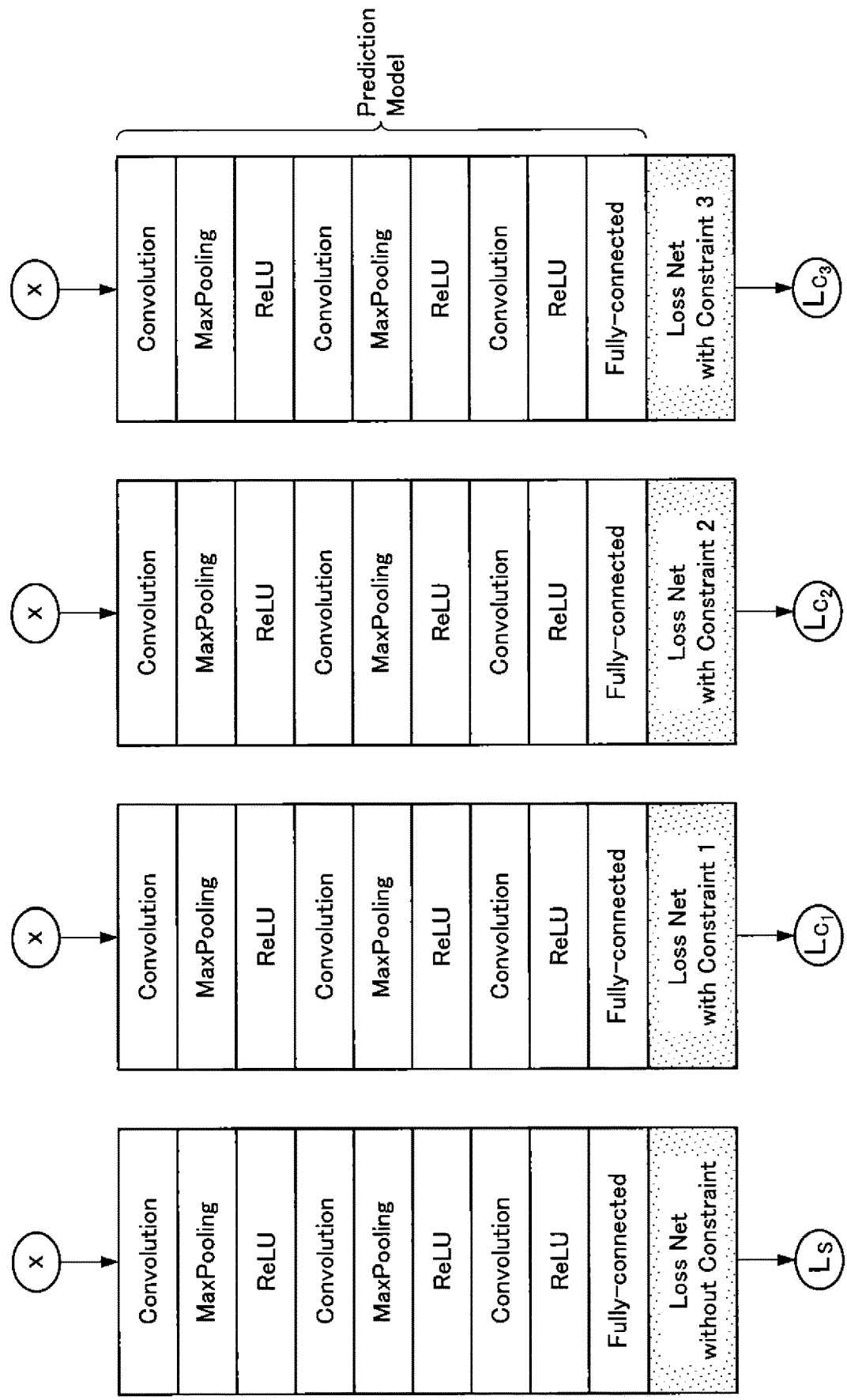
FIG. 8 is a diagram illustrating an example of a network structure according to the present embodiment.

FIG. 8 is a diagram illustrating an example of a network structure according to the present embodiment. FIG. 8 sequentially illustrates a learning model corresponding to no constraint label and learning models corresponding to the constraint items 1 to 3 from the left, which is similar to FIG. 7. As illustrated in FIG. 8, the learning model according to the present embodiment is roughly classified into a prediction model (target object position estimation unit) and a loss network including a loss function (constraint loss).

Moreover, in FIG. 8, a common structure in these learning models is shown with a plain background. In other words, each learning model uses the common prediction model to estimate the position of a detection target from the input moving image and frame data relating to time-series sensor information.

On the other hand, in FIG. 8, different structures in the respective learning models are shown with a dotted background. The learning unit 130 according to the present embodiment is capable of switching the loss function corresponding to the constraint label, that is, the objective function whose error is to be minimized by learning the parameters by switching the network on the basis of the constraint label. Moreover, the loss function used herein is not a single loss function such as cross entropy or square error but may itself be a neural network.

The switching of the network based on the constraint label described above is described below in more detail. The learning model is first typically constructed by adding a loss function to a prediction model that predicts a label from data. A model of a neural network illustrated in FIG. 8 is considered as, in one example, the prediction model described above.

The prediction model illustrated in FIG. 8 performs various processing on input x and outputs y. As illustrated in FIG. 8, Convolution, MaxPooling, and ReLU are functions representing linear or non-linear processing. Here, the function representing linear processing has a parameter, and the value of the parameter is learned so that the loss function is smaller in the prediction model. Moreover, Convolution is a linear function that is often used for a moving image or time-series sensor information. In addition, MaxPooling is one of the processing for thinning out excessive data. In addition, ReLU is simple non-linear processing. In a case where the above-mentioned processing is described as a function, it can be expressed as a composite function of Formula (12) below.

[Math. 5]

$$h_1 = conv(x, w_1, b_1)$$

$$h_2 = max\_pooling(h_1)$$

$$h_3 = relu(h_2)$$

$$h_4 = conv(h_3, w_2, b_2)$$

$$h_5 = max\_pooling(h_4)$$

$$h_6 = relu(h_5)$$

$$h_7 = conv(h_6, w_3, b_3)$$

$$h_8 = relu(h_7)$$

$$y = fc(h_8, w_4, b_4) \tag{12}$$

Moreover, in Formula (12) above, x is a frame data relating to a moving image or time-series sensor information, and y is, in one example, a regression value (predicted value) relating to the position or area size of a detection target. In addition, w and b in Formula (12) above indicate the weight and the bias, respectively.

Here, the parameters in the neural network are collectively referred to as θ, and the processing is defined as $y = f_\theta(x)$ for the purpose of simple description. Moreover, x indicates data, and y indicates a predicted value of the label.

Here, in the case of the unconstrained model, if the problem to be learned is a regression problem, the predicted value y of the label with respect to the data x in the real environment may be treated as a predicted value as it is without performing any further processing. On the other hand, in a case where the learned problem is a classification problem, the predicted value y is input to a Softmax function and is treated as an approximation probability.

The following description is continued on the assumption that labels are continuous values such as regression problems. Moreover, the learning model being used is a model in which a loss network is connected to a prediction model, as illustrated in FIG. 8. In a case where a supervised model is used as the unconstrained model, a square error between prediction and actual measurement is usually used for the loss network to be added to the prediction model. Thus, in the supervised learning model, Formula (13) below is given to the prediction model.

[Math. 6]

$$L^{(S)}(\theta) = \sum_i |f_\theta(x_i) - \hat{y}_i|^2 \tag{13}$$

Here, in Formula (13) above, $x_i$ represents the $i^{th}$ data, and $y_i$ (hat operator) represents the value of the label.

On the other hand, in the case of a constrained learning model, a formula representing the constraint on a label is defined previously for each type of the relevant constraint. Here, examples of the types of constraint described above include uniformly accelerated motion, uniform motion, circular motion described above, or the like, but the types of constraint according to the present embodiment are not limited to such examples. In addition, as illustrated in FIG. 8, a common model may be used as the prediction model in the learning model regardless of the types of constraint. On the other hand, the learning unit 130 according to the present embodiment has one feature to use a loss network (loss function) 20 corresponding to the constraint on the basis of the type of the constraint.

It is easy to understand an example in which a loss network representing a constraint is expressed as one that predicts a label by a formula different from that of a neural network, in one example, as in Formula (14) below. Moreover, in Formula (14) below, λ collectively represents the constraint parameters.

[Math. 7]

$$y = g_\lambda(t) \tag{14}$$

Here, in one example, assuming that a two-dimensional coordinate is set and assuming that the constraint on the action of the detection target is set as uniform linear motion, Formula (14) above is expressed as Formula (15) below by using linear parameter representation. In addition, in the case of uniformly accelerated motion, Formula (14) above can be expressed as Formula (16). In addition, in the case of circular motion, Formula (14) above can be expressed as Formula (17) below.

[Math. 8]

$$g_\lambda(t) = u + vt \tag{15}$$

$$g_\lambda(t) = u + vt + wt^2 \tag{16}$$

$$g_\lambda(t) = u + (a \cos \omega t, b \sin \omega t)^T \tag{17}$$

Moreover, in Formulas (15) to (17) above, a plurality of parameters such as u, v, w, a, b, and ω is shown, but the plurality of parameters is collectively treated as λ. In this event, as described above, the constraint parameter k has the same value in the same dataset group, but has different parameter values between different dataset groups.

Further, t represents metadata (e.g., a frame ID or time obtained from the frame ID) assigned to each data that constitutes time-series data.

The use of the constraint described above allows the loss to be expressed by Formula (18) below for each series data.

[Math. 9]

$$L(\theta, \lambda) = \sum_t |f_\theta(x) - g_\lambda(t)|^2 \tag{18}$$

Formula (18) above shows that an error between the prediction function $f_\theta$ by the neural network and the prediction function $h_\lambda$ by the constraint is regarded as a function of the parameter θ of the neural network and the constraint parameter λ.

In this event, the purpose of learning by the learning unit 130 is to find θ and λ that reduce the error between two prediction values described above. Among them, the constraint parameter λ is a parameter value determined for each series, so it is sufficient to be determined as a parameter that minimizes Formula (18) above. If the solution of λ is analytically obtained as a function of $f_\theta(x)$, then $g_\lambda(t)$ can be rewritten as a function of $f_\theta(x)$ as in Formula (19) below. In addition, the use of the result of Formula (19) allows the loss to be expressed by Formula (20) below.

[Math. 10]

$$g_\lambda(t) = h(t, f_\theta(x)) \quad (19)$$

$$L(\theta, \lambda) = \sum_t |f_\theta(x) - h(t, f_\theta(x))|^2 \quad (20)$$

As described above, the learning unit 130 according to the present embodiment is capable of switching between learning models corresponding to the constraint label by formulating the loss function in advance for each constraint. In addition, although a case where it fails to deform like Formula (19) or Formula (20) above is assumed, in this case, as being described in the description of the above-mentioned circular motion, it is possible to cope with it by performing processing such as optimizing Formula (18) to behavior.

The procedure of learning by the learning unit 130 according to the present embodiment is subsequently described in detail. The learning unit 130 according to the present embodiment performs learning by inverse error propagation using the iterative gradient method, similar to the case of learning using typical deep learning. Moreover, any method such as classical stochastic gradient descent (SGD) or advanced adaptive moment estimation (ADAM) may be used as the type of gradient method.

Figure 9:
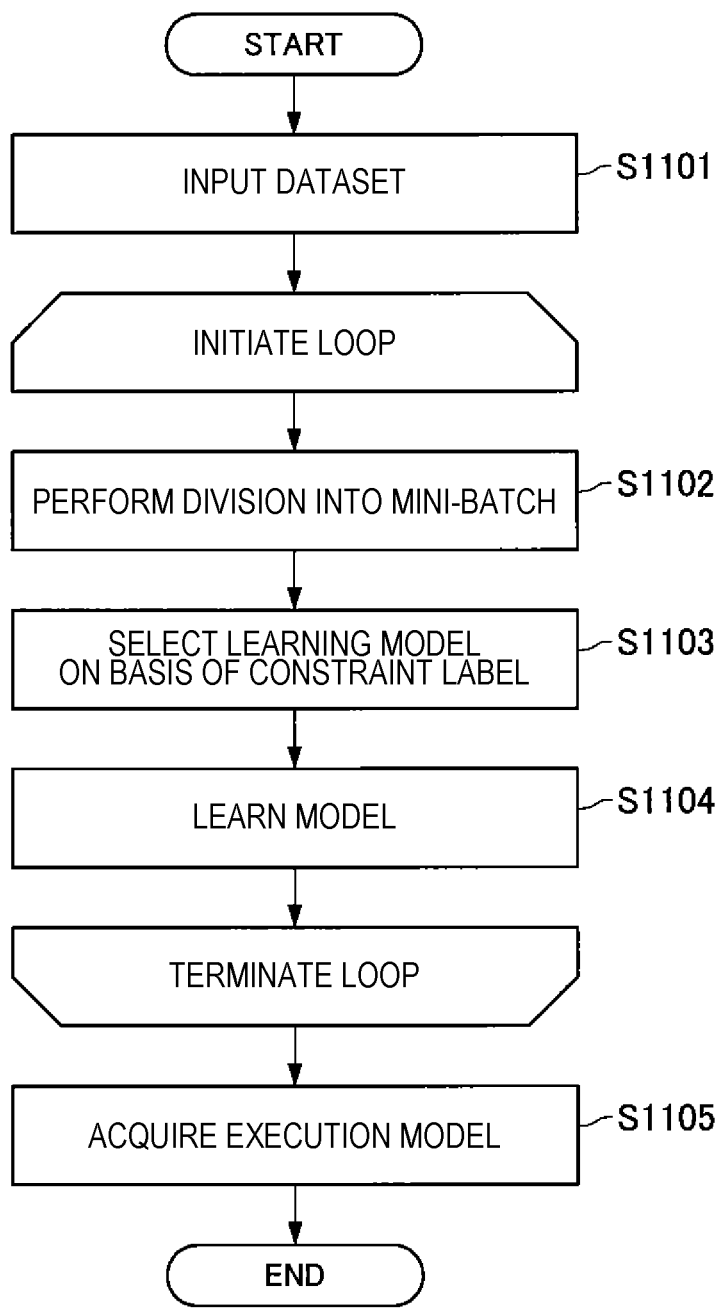
FIG. 9 is a flowchart illustrating a procedure of learning by a learning unit according to the present embodiment.

FIG. 9 is a flowchart illustrating the procedure of learning by the learning unit 130 according to the present embodiment. Referring to FIG. 9, first, a training dataset is input to the learning unit 130 (S1101). Subsequently, the learning unit 130 repeatedly executes each step of division into small size (mini-batch) (S1102), selection of learning model based on constraint label (S1103), and learning of model (S1104), and finally acquires an execution model (S1105).

In this event, as described above, unlike the typical deep learning, the learning unit 130 according to the present embodiment has a feature of selecting a learning model on the basis of a training dataset and a constraint label.

Figure 10:
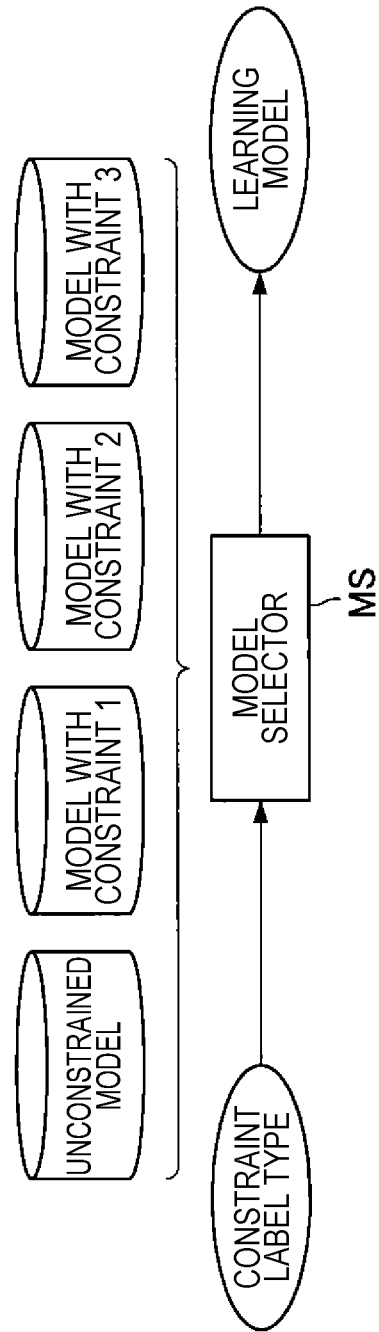
FIG. 10 is a diagram illustrated to describe switching between learning models according to the present embodiment.

FIG. 10 is a diagram illustrated to describe switching between learning models according to the present embodiment. As illustrated in FIG. 10, the learning unit 130 according to the present embodiment may have a model selector MS that implements switching between learning models.

The model selector MS according to the present embodiment selects and outputs a relevant learning model on the basis of the type of the normal label or the constraint label that is input for each mini-batch. The model selector MS may select a corresponding learning model from, in one example, an unconstrained model (supervised model), learning models corresponding to the constraint items 1 to 3, or the like, on the basis of the input.

Moreover, in practice, processing may be performed such that only the loss network is switched without changing the common prediction model. The model selector MS can also be implemented by being incorporated on the network.

Figure 11:
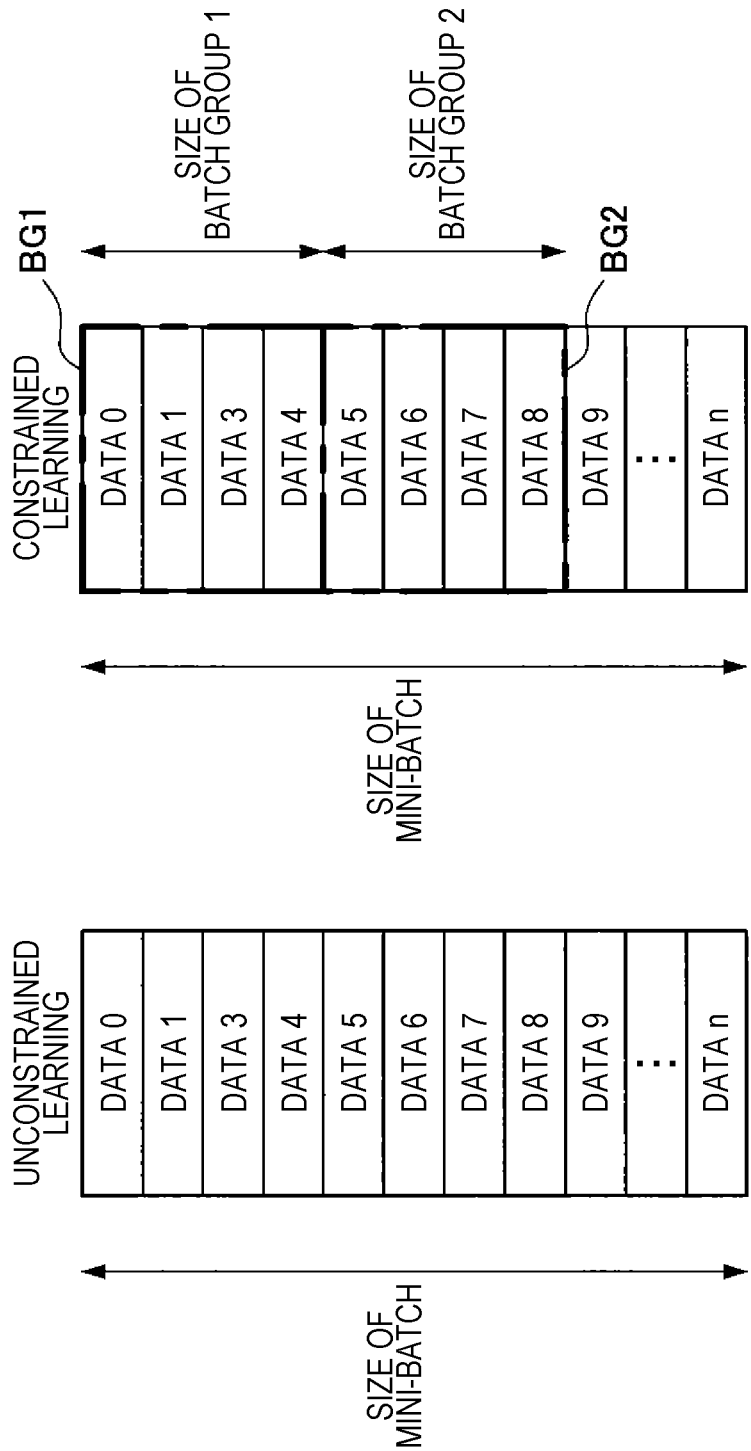
FIG. 11 is a diagram illustrated to describe features of mini-batch according to the present embodiment.

Further, the learning approach according to the present embodiment has a feature in a method of generating mini-batch. FIG. 11 is a diagram illustrated to describe the feature of mini-batch according to the present embodiment. The left side of FIG. 11 shows a structural example of the mini-batch in the case of performing unconstrained learning, and the right side of FIG. 11 shows a structural example of the mini-batch in the case of performing constrained learning.

As illustrated in FIG. 11, in a case of performing the unconstrained learning, each data included in the mini-batch may be configured by a single batch group. On the other hand, in a case of performing constrained learning, the mini-batch may have a plurality of batch groups. Here, the above-mentioned mini-batch group may be defined for each dataset group described above.

In other words, a dataset group having different constraint types, a dataset group having the same constraint type but different constraint parameters, and a plurality of mini-batch groups corresponding to an unconstrained dataset group may coexist in the mini-batch according to the present embodiment.

The selection of a learning model and the features of the mini-batch according to the present embodiment are described above. According to the features described above, it is possible to select dynamically a learning model corresponding to the input training dataset and to achieve flexible learning corresponding to a plurality of action types.

Moreover, the assignment of constraint labels according to the present embodiment is not limited to manual assignment. The assignment of constraint labels according to the present embodiment may be implemented by, in one example, a constraint label estimator that estimates a constraint label based on data.

Figure 12:
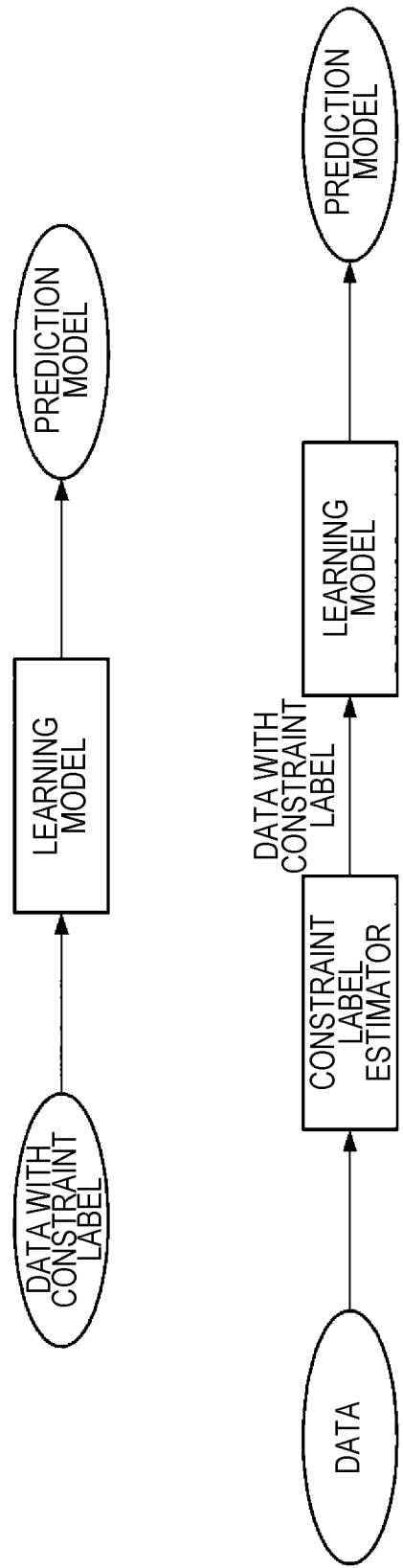
FIG. 12 is a diagram illustrated to describe automatic assignment of a constraint label according to the present embodiment.

FIG. 12 is a diagram illustrated to describe automatic assignment of constraint labels according to the present embodiment. The upper part of FIG. 12 shows a block diagram corresponding to the learning method in a case where the constraint label estimator is not used. In addition, the lower part of FIG. 12 shows a block diagram corresponding to a learning method in the case where the learning unit 130 has the constraint label estimator.

As illustrated in the upper part of FIG. 12, in the case where the constraint label estimator is not used, if data and a constraint label are input to a learning device, the learning device outputs a prediction model that predicts a normal label from the data.

On the other hand, in the case where the learning unit 130 has the constraint label estimator, if data is input to the constraint label estimator, the constraint label estimator internally generates a constraint label corresponding to the input data, and the learning device generates a prediction model on the basis of the constraint label and data.

In this way, the constraint label estimator according to the present embodiment makes it possible to reduce significantly the burden associated with the assignment of constraint labels. Moreover, the above-mentioned function of the constraint label estimator may be acquired by the prior learning.

Figure 13:
FIG. 13 is a block diagram illustrated to describe prior learning of a constraint label estimator according to the present embodiment.

FIG. 13 is a block diagram illustrated to describe the prior learning of the constraint label estimator according to the present embodiment. As illustrated in FIG. 13, the constraint label estimator according to the present embodiment is generated by learning of the constraint-label learning device on the basis of the data with constraint label.

Moreover, the data with constraint label illustrated in FIG. 13 is not necessarily identical to the data with constraint label illustrated in FIG. 12. If both are the same, it is possible to learn in the usual way without intentionally estimate the constraint label.

The automatic assignment of constraint labels according to the present embodiment is described above. The constraint label estimator according to the present embodiment makes it possible to reduce significantly the burden of manually assigning constraint labels, thereby achieving learning more efficient.

<<1.4. Detailed Example of Learning Target>>

A learning target according to the present embodiment is now described by taking a detailed example.

(Pedestrian Detection Tracker)

The learning for generating a tracker that detects a pedestrian is first described. In this event, in order to generate a tracker with high accuracy, it is necessary to learn various appearances and changes in appearances of a pedestrian. For this reason, in collecting training datasets, it is assumed that an imaging target person is made to perform natural motion relating to walking and the motion is imaged.

However, as described above, in the case of the comparative approach 1, the work of assigning the normal label to each frame image of the captured moving image is enormous. On the other hand, in the case of the comparative approach 2, although the labeling of the normal label for each frame image is not necessary, it can cope with only a single action of the imaging target person, so it is difficult to cope sufficiently with the change in appearances described above or the like.

Figure 14:
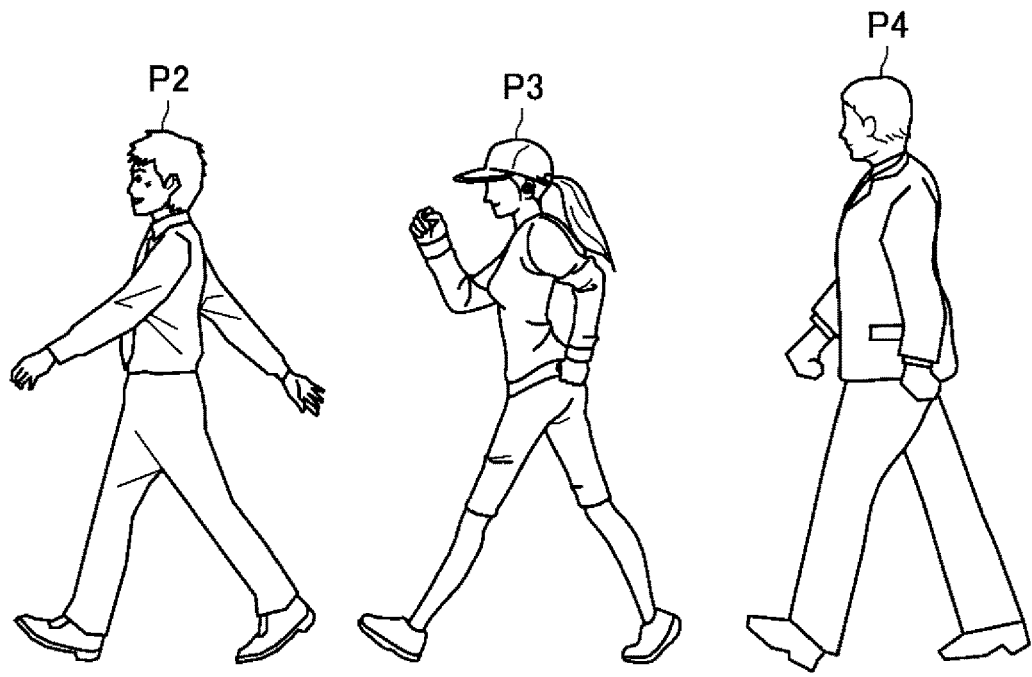
FIG. 14 is a diagram illustrated to describe appearance of a detection target according to the present embodiment.

Specifically, in one example, it is assumed that learning is performed using the constraint on uniform linear motion such as walking. In this event, in one example, in the comparative approach 2, it is possible to learn only the actions of detection targets P2 to P4 that walk in the sideways direction as illustrated in FIG. 14.

Figure 15:
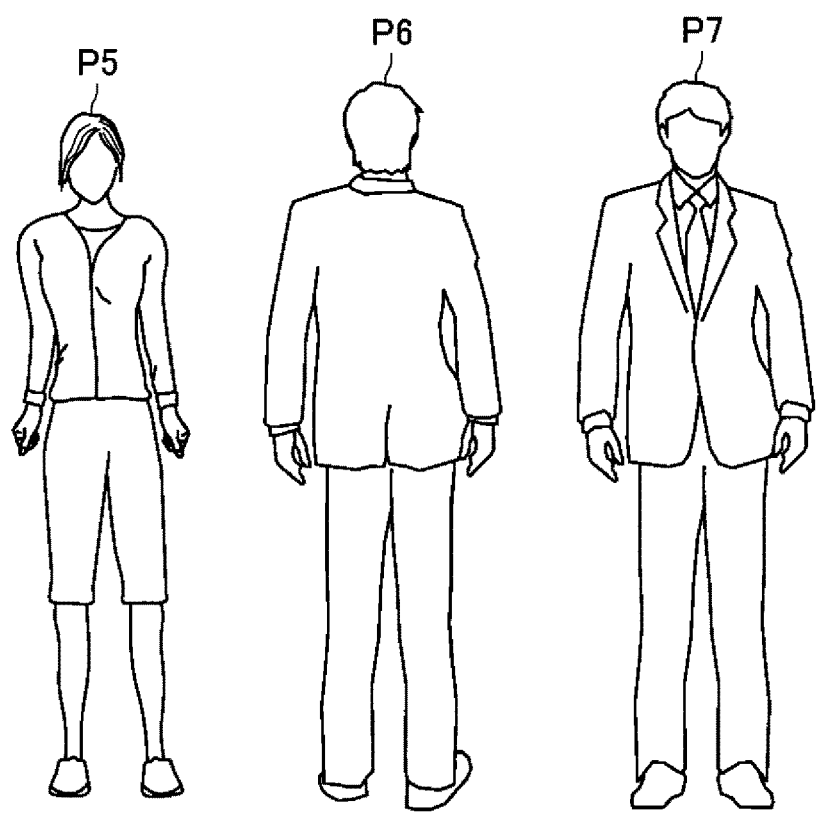
FIG. 15 is a diagram illustrated to describe appearance of a detection target according to the present embodiment.

In other words, in the comparative approach 2, it is difficult to learn the actions of detection targets P5 to P7 walking forward or backward as illustrated in FIG. 15.

For this reason, in the information processing method according to the present embodiment, it is possible to generate trackers that correspond to the various appearances of a pedestrian by learning other types of constraint as the constraint on an action of a pedestrian such as circular motion, approaching (zooming up), going away (zooming down), or the like in addition to uniform linear motion.

Figure 16:
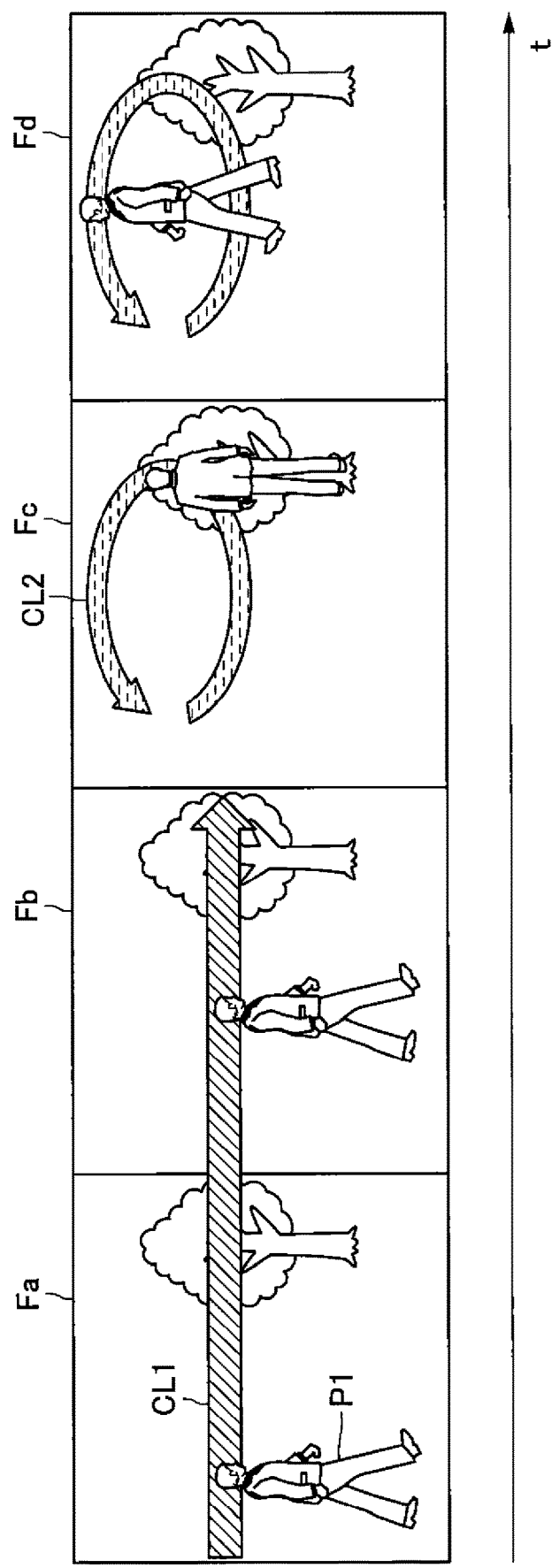
FIG. 16 is a diagram illustrated to describe training data according to the present embodiment.

FIG. 16 is a diagram illustrated to describe training data according to the present embodiment. In FIG. 16, moving images obtained capturing the walking actions of the detection target P1 are shown in time series. Here, in the section of frame images Fa to Fb in the moving image, the detection target P1 performs uniform linear motion, and in the section of frame images Fc to Fd, the detection target P1 performs circular motion.

In this event, in the information processing method according to the present embodiment, it is possible to efficiently perform learning relating to a plurality of actions and generate trackers corresponding to various appearances of the detection target P1 by assigning different constraint labels to each action (motion) section of the detection target P1 in the moving image.

In one example, in the case of an example illustrated in FIG. 16, a constraint label CL1 corresponding to uniform linear motion may be assigned to the section formed by the frame images Fa to Fb. In addition, a constraint label CL2 corresponding to circular motion may be assigned to the section formed by the frame images Fb to Fd. Moreover, the labeling of the constraint labels C1 and C2 may be automatically performed by the above-mentioned constraint label estimator.

In this event, several approaches can be considered for collecting the training dataset. In one example, it is possible to collect a large number of training datasets efficiently by collecting moving images obtained by capturing person's walking from a moving image site or the like and assigning a constraint label corresponding to each action (motion) section to the moving image.

Moreover, in this event, the moving image may be divided into files for each action section (each constraint label) as necessary. Moreover, the constraint labels are not necessarily assigned to all frame images in the file, and one constraint label may be assigned to the file or may be managed by the index as described above.

Further, it is also assumed that a motion sensor is attached to a subject (detection target) to perform an action, and a constraint label (motion label) is estimated on the basis of sensor information collected by the motion sensor. In this case, the file may also be divided for each estimated motion label as necessary.

Further, an exact position label (normal label) may be assigned to some of the training datasets. In this case, after designing the prediction model, the learning is performed using the unconstrained learning model and the plurality of constrained learning models prepared for each motion type.

In this way, the information processing method according to the present embodiment allows a large amount of training data to be easily secured at low cost, thereby performing efficient and highly accurate learning.

(Joint Point Tracker)

The learning for generating a tracker that detects movement of human joint points is now described. An example of a case where a human joint point is intended to be detected includes, in one example, detection of a specific action of a player or a performer in sports or dance.

Figure 17:
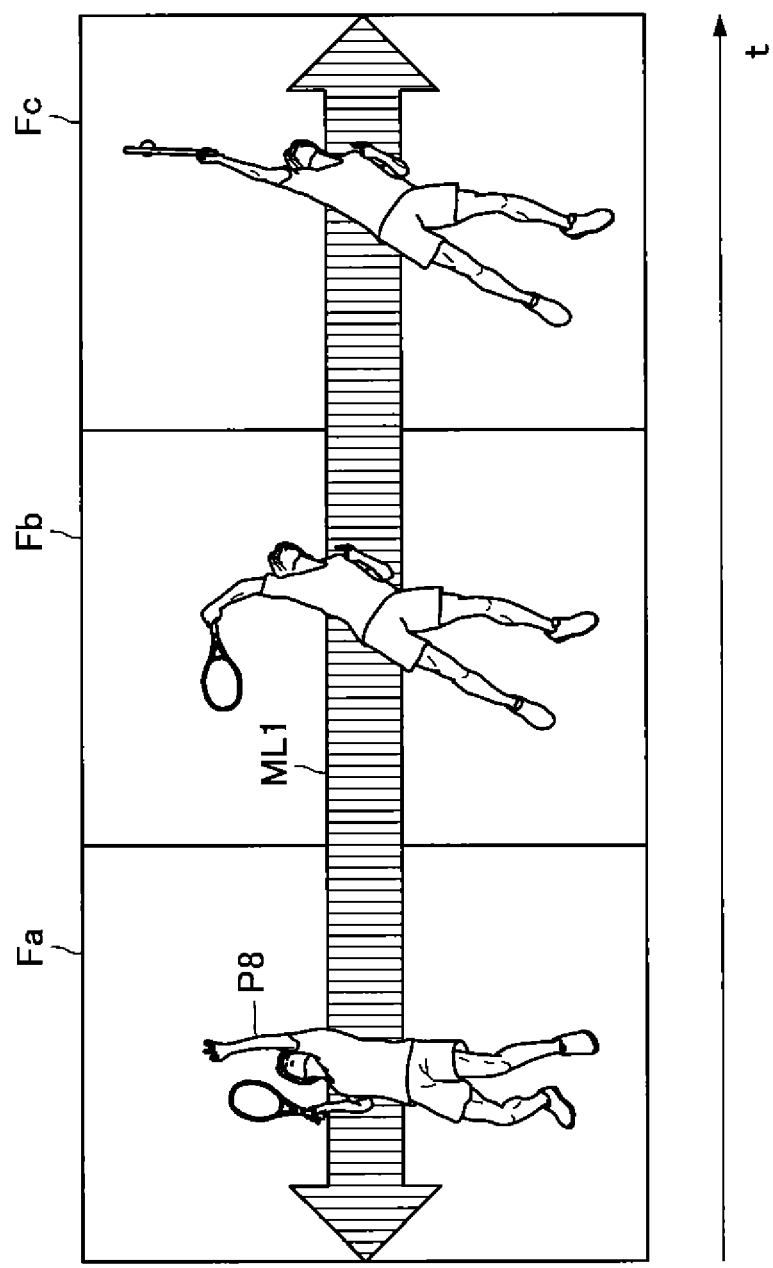
FIG. 17 is a diagram illustrated to describe tracking of a joint point according to the present embodiment.
Figure 18:
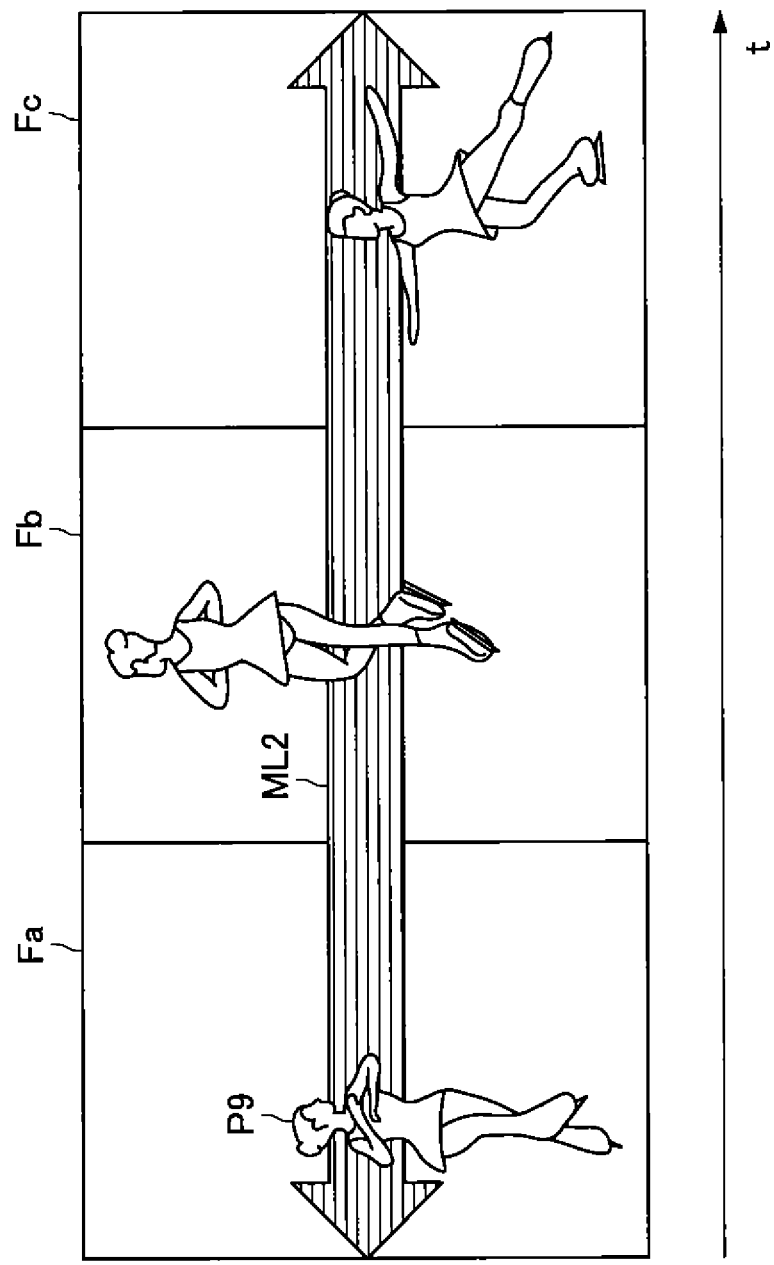
FIG. 18 is a diagram illustrated to describe tracking of a joint point according to the present embodiment.

FIG. 17 and FIG. 18 are diagrams illustrated to describe tracking of a joint point according to the present embodiment. FIG. 17 illustrates an example of a case where the learning unit 130 according to the present embodiment learns the movement of a joint point relating to a specific action in tennis. In the example illustrated in FIG. 17, frame images Fa to Fc relating to a moving image obtained by capturing a state in which a detection target P8 who is serving a ball are shown in time series.

Further, FIG. 18 illustrates an example of a case where the learning unit 130 according to the present embodiment learns the movement of a joint point relating to the specific action in the figure skate. In an example illustrated in FIG. 18, frame images Fa to Fd relating to a moving image obtained by capturing a state in which a detection target P9 performs triple axle are shown in time series.

In the detection of the joint point, in the case of the comparative approach 1, it is also necessary to assign a normal label to all the joint points in all the frame images Fa to Fc illustrated in FIGS. 17 and 18, which leads to increase in the burden of labeling.

Further, in the case of the comparative approach 2, although the burden of labeling can be avoided, only a single specific action of the detection target P8 or P9 can be learned. For this reason, in the case of the comparative approach 2, in one example, it is difficult to correspond to the specific action such as smash, forehand stroke, backhand stroke, forehand volley, backhand volley, or the like that is performed by the detection target P8. Similarly, in the comparative approach 2, it is difficult to cope with the specific action such as triple loop, triple Lutz, double axle, or the like performed by the detection target P9.

On the other hand, according to the information processing method according to the present embodiment, it is sufficient if a motion label corresponding to the specific action may be assigned to each section in the moving image where the specific action is executed, which is similar to the case of detection of a pedestrian.

In one example, in the case of the example illustrated in FIG. 17, in the information processing method according to the present embodiment, a motion label ML1 corresponding to the serve is assigned to the section of the image frames Fa to Fc. In addition, a motion label corresponding to the specific action such as smash captured in the section may be separately assigned to the section including another frame image in the moving image.

Further, in one example, in the case of the example illustrated in FIG. 18, in the information processing method according to the present embodiment, a motion label ML2 corresponding to the triple axle is assigned to the section of the image frames Fa to Fc. In addition, a motion label corresponding to a specific action such as a step captured in the section may be separately assigned to the section including another frame image in the moving image.

Moreover, the method of collecting the training dataset may be similar to that for detection of a pedestrian.

In this way, the information processing method according to the present embodiment allows a large amount of training data to be efficiently collected while significantly reducing the burden of labeling relating to joint points, thereby generating a joint point tracker with high accuracy in a shorter time.

Moreover, although the above description is given of the case where the motion label according to the present embodiment is a label in which the specific action of the detection target is defined in sports, dance, or the like as an example, the motion label according to the present embodiment is not limited to this example.

The motion label according to the present embodiment may be, in one example, a label that defines the action of the detection target accompanying the specific behavior. Examples of the above-mentioned specific behavior include life behaviors such as going shopping and taking a train. According to the motion label, in one example, application such as detection of a characteristic action of a detection target during shopping is also possible.

(Vehicle Tracker)

The learning for generating a tracker that detects a vehicle is now described. Here, in order to make a position estimator of the vehicle learn, it is assumed that sensor information relating to the movement of the vehicle and a moving image are used as a training dataset.

In this event, in the information processing method according to the present embodiment, first, the movement of the vehicle is defined as uniform velocity, acceleration, deceleration, left turn, right turn, forward, reverse, and the like.

Figure 19:
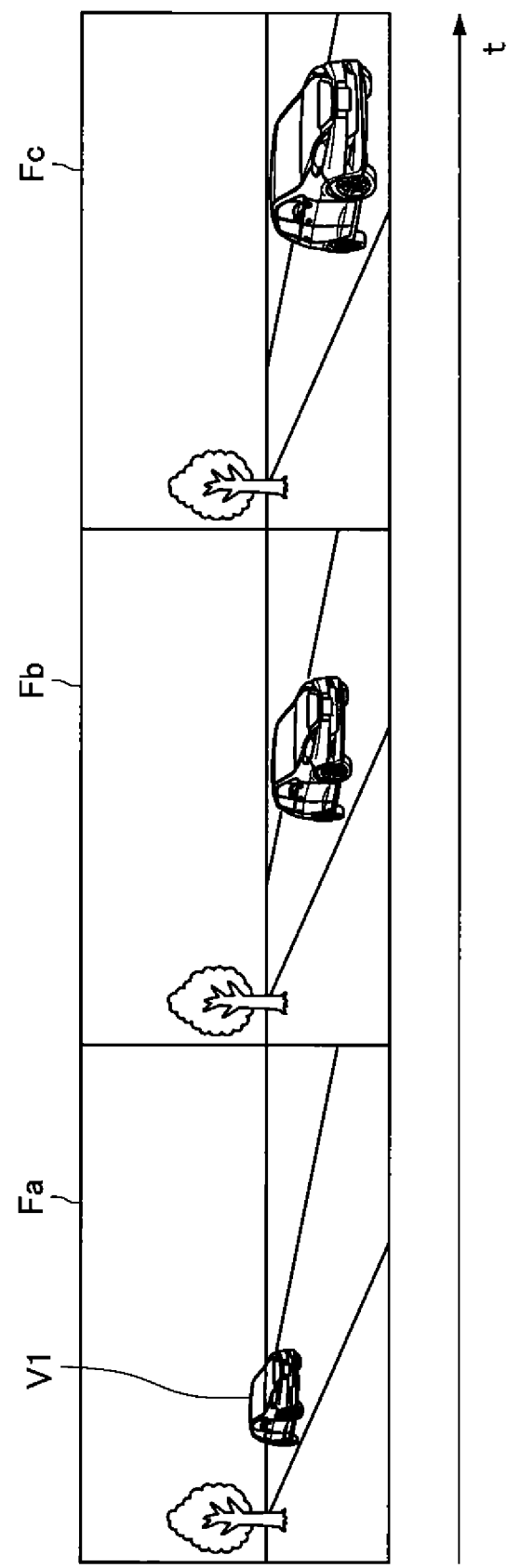
FIG. 19 is a diagram illustrating an example of a training dataset used for learning of a vehicle tracker according to the present embodiment.
Figure 20:
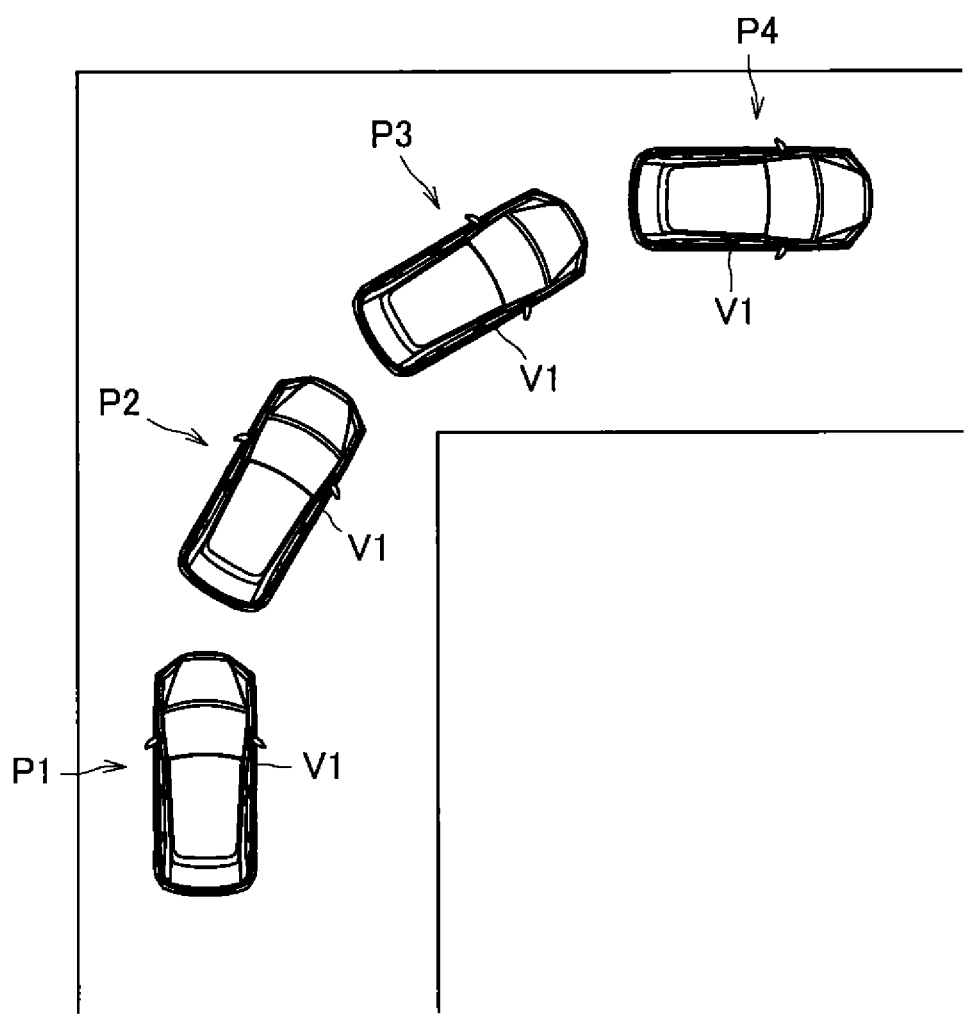
FIG. 20 is a diagram illustrating an example of a training dataset used for learning of a vehicle tracker according to the present embodiment.

FIG. 19 and FIG. 20 are diagrams illustrating an example of a training dataset used for learning of a vehicle tracker according to the present embodiment. In FIG. 19, frame images Fa to Fc relating to a moving image obtained by capturing a state in which a detection target V1 performing uniform linear motion are shown in time series. As illustrated in FIG. 19, in a case of using a moving image as training data, the information to be finally estimated is the position of the vehicle in the image.

Further, FIG. 20 illustrates an example in which the motion label is estimated on the basis of the sensor information acquired when the detection target V1 makes right turn to positions P1 to P4. Here, the above-mentioned sensor information includes, in one example, information collected by an acceleration sensor, a gyro sensor, a geomagnetic sensor, and the like, or operation information of an accelerator, a brake, a steering, and the like. As illustrated in FIG. 20, in the case of using sensor information as training data, the information to be finally estimated is a relative position from the vehicle position several frames before (e.g., position P1).

Even in the case of using a moving image as training data or the case of using the sensor information, it is necessary to assign a normal label to all the frames in the case of comparative approach 1, and so the burden associated with labeling increases.

Further, in the case of the comparative approach 2, although the burden of labeling can be avoided, only the specific action of the detection target V1 can be learned. For this reason, in the case of the comparative approach 2, in one example, it is difficult to cope with a change in appearances or a change in positions when the detection target P8 perform reversing, deceleration, or the like.

On the other hand, according to the information processing method according to the present embodiment, similar to the case of pedestrian detection and joint point detection, it is possible to cope with a plurality of types of constraint simultaneously by assigning a motion label corresponding to the specific action to each section in which the specific action is executed regarding moving images and sensor information.

In this way, according to the information processing method according to the present embodiment, it is possible to implement efficiently a detector for detecting a vehicle or a position estimator for implementing the position estimation of a vehicle using a small amount of labeling data. According to the information processing method according to the present embodiment, it is possible to significantly reduce the development time as compared to the comparative approach 1 or the comparative approach 2, and it is further possible to implement the detector or position estimator flexibly compatible with various actions of a vehicle.

2. HARDWARE CONFIGURATION EXAMPLE

Figure 21:
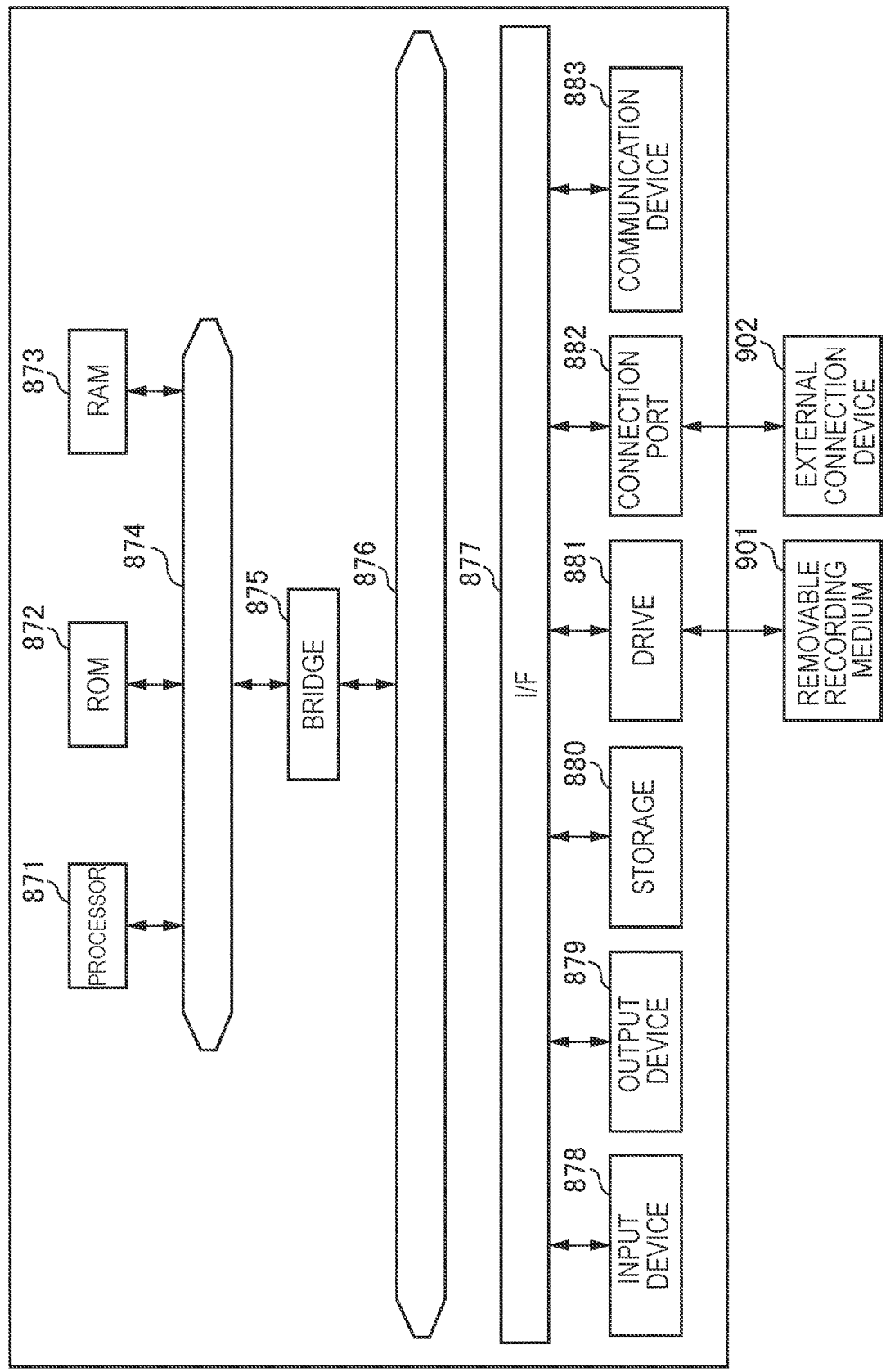
FIG. 21 is a diagram illustrating an example of a hardware configuration of an information processing apparatus according to an embodiment of the present disclosure.

An example of the hardware configuration common to the information processing apparatus 10 according to an embodiment of the present disclosure is now described. FIG. 21 is a block diagram illustrating an example of the hardware configuration of the information processing apparatus 10 according to an embodiment of the present disclosure. Referring to FIG. 21, the information processing apparatus 10 includes, in one example, a processor, a ROM 872, a RAM 873, a host bus 874, a bridge 875, an external bus 876, an interface 877, an input device 878, an output device 879, a storage 880, a drive 881, a connection port 882, and a communication device 883. Moreover, the hardware configuration shown here is illustrative, and some of components can be omitted. In addition, a component other than the components shown here can be further included.

(Processor 871)

The processor 871 functions as, in one example, an arithmetic processing unit or a control device, and controls some or all of the operations of each component on the basis of various programs recorded in the ROM 872, the RAM 873, the storage 880, or a removable recording medium 901.

(ROM 872 and RAM 873)

The ROM 872 is a means for storing programs loaded into the processor 871, data used for operation, or the like. The RAM 873 temporarily or permanently stores, in one example, a program to be loaded into the processor 871, various parameters appropriately changing in executing the program, or the like.

(Host Bus 874, Bridge 875, External Bus 876, and Interface 877)

The processor 871, the ROM 872, and the RAM 873 are mutually connected via, in one example, the host bus 874 capable of high-speed data transmission. On the other hand, the host bus 874 is connected to the external bus 876 having a relatively low data transmission rate, in one example, via the bridge 875. In addition, the external bus 876 is connected to various components via the interface 877.

(Input Device 878)

Examples of the input device 878 include a mouse, a keyboard, a touch panel, buttons, a switch, a lever, or the like. Furthermore, examples of the input device 878 include a remote controller capable of transmitting a control signal using infrared rays or other radio waves (hereinafter referred to as a remote controller). In addition, the input device 878 includes an audio input device such as a microphone.

(Output Device 879)

The output device 879 is a device capable of visually or audibly notifying the user of the acquired information, which includes a display device such as a cathode ray tube (CRT), an LCD, or an organic EL, an audio output device such as a loudspeaker or a headphone, a printer, a mobile phone, a facsimile, or the like. In addition, the output device 879 according to the present disclosure includes various vibrating devices capable of outputting tactile stimulation.

(Storage 880)

The storage 880 is a device used to store various types of data. Examples of the storage 880 include a magnetic storage device such as hard disk drives (HDDs), a semiconductor storage device, an optical storage device, a magneto-optical storage device, or the like.

(Drive 881)

The drive 881 is a device that reads information recorded on the removable recording medium 901 such as a magnetic disk, an optical disk, a magneto-optical disk, or semiconductor memory or writes information to the removable recording medium 901.

(Removable Recording Medium 901)

Examples of the removable recording medium 901 include a DVD medium, a Blu-ray (registered trademark) medium, an HD DVD medium, various kinds of semiconductor storage media, or the like. Of course, the removable recording medium 901 is preferably, in one example, an IC card or an electronic device mounted with a contactless IC chip.

(Connection Port 882)

The connection port 882 is a port used for connection with an external connection device 902, such as a universal serial bus (USB) port, an IEEE 1394 port, a small computer system interface (SCSI), an RS-232C port, or an optical audio terminal.

(External Connection Device 902)

Examples of the external connection device 902 include a printer, a portable music player, a digital camera, a digital video camera, an IC recorder, or the like.

(Communication Device 883)

The communication device 883 is a communication device used for connection with a network, and examples thereof include a communication card for wired or wireless LAN, Bluetooth (registered trademark), or wireless USB (WUSB), a router for optical communication, a router for asymmetric digital subscriber line (ADSL), or various communication modems.

3. CONCLUDING REMARKS

As described above, the information processing apparatus 10 according to an embodiment of the present disclosure includes the learning unit 130 that performs machine learning using the training data to which the constraint label is assigned. In addition, the above-mentioned constraint label may be a label that defines the type of constraint that the normal label is to follow. Such a configuration makes it possible to reduce the burden of label assignment and achieve learning that is more flexible.

The preferred embodiment(s) of the present disclosure has/have been described above with reference to the accompanying drawings, whilst the present disclosure is not limited to the above examples. A person skilled in the art can find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure can achieve other effects that are clear to those skilled in the art from the description of this specification.

Further, the respective steps in the processing of the information processing apparatus 10 in this specification are not necessarily executed in chronological order in accordance with the order illustrated in the flowcharts. In one example, the respective steps in the processing of the information processing apparatus 10 can be processed in the order different from the order illustrated in the flowcharts, or can also be processed in parallel.

Additionally, the present technology may also be configured as below.

(1)

An information processing apparatus including:

a learning unit configured to perform machine learning using training data to which a constraint label is assigned, in which the constraint label is a label in which a type of constraint that a normal label is to follow is defined.

(2)

The information processing apparatus according to (1), in which the learning unit selects a learning model on the basis of the constraint label.

(3)

The information processing apparatus according to (2), in which the learning unit selects a network relating to the learning model on the basis of the constraint label.

(4)

The information processing apparatus according to (2) or (3), in which the learning unit selects a loss function relating to the learning model on the basis of the constraint label.

(5)

The information processing apparatus according to any of (1) to (4), in which the learning unit has a constraint label estimator configured to estimate the constraint label on the basis of the training data.

(6)

The information processing apparatus according to any of (1) to (5), in which the training data includes action information of a detection target in time series, and the normal label is position information of the detection target.

(7)

The information processing apparatus according to any of (1) to (6), in which the training data is a set of frame images in a moving image, and the normal label is position information of a detection target in the frame image.

(8)

The information processing apparatus according to (6), in which the training data is sensor information relating to an action of the detection target.

(9)

The information processing apparatus according to any of (6) to (8), in which the constraint label is a motion label in which an action type of the detection target is defined.

(10)

The information processing apparatus according to (9), in which the motion label is a label in which an action type of the detection target that follows a physical law is defined.

(11)

The information processing apparatus according to (10), in which the action type of the detection target that follows the physical law includes at least one of uniform motion, uniformly accelerated motion, or circular motion.

(12)

The information processing apparatus according to (9), in which the motion label is a label in which a specific action of the detection target is defined.

(13)

The information processing apparatus according to (9), in which the motion label is a label in which an action of the detection target associated with specific behavior is defined.

(14)

The information processing apparatus according to any of (1) to (13), in which the constraint label is category information relating to classification of time-series data.

(15)

The information processing apparatus according to any of (1) to (14), in which the learning unit performs machine learning using the training data grouped for each data sharing the identical constraint.

(16)

The information processing apparatus according to (15), in which the grouping is performed for each time-series data relating to an identical specific action of a detection target.

(17)

The information processing apparatus according to (15) or (16), in which the grouping is performed on the basis of the constraint label and a parameter relating to the constraint.

(18)

The information processing apparatus according to any of (15) to (17), in which the grouping is performed by assigning an index to time-series data.

(19)

An information processing method including:

performing, by a processor, machine learning using training data to which a constraint label is assigned, in which the constraint label is a label in which a type of constraint that a normal label is to follow is defined.

(20)

A program causing a computer to function as an information processing apparatus including:

a learning unit configured to perform machine learning using training data to which a constraint label is assigned, in which the constraint label is a label in which a type of constraint that a normal label is to follow is defined.

REFERENCE SIGNS LIST

10 information processing apparatus
110 input unit
120 control unit
130 learning unit
140 output unit

The invention claimed is:

1. An information processing apparatus comprising:
a learning unit configured to perform machine learning using training data to which a constraint label is assigned from among a plurality of constraint labels,
wherein the training data is a set of frame images in a moving image,
wherein a normal label of the training data includes position information of a detection target in each frame image,
wherein each constraint label is a discrete label in which a type of constraint that continuous values of the normal label follow is defined,
wherein the assigned constraint label includes a motion label in which an action type of the detection target is defined based on the continuous values of the normal label indicating the position information of the detection target, and
wherein the learning unit is implemented via at least one processor.

2. The information processing apparatus according to claim 1,
wherein the learning unit is further configured to select a learning model on a basis of the assigned constraint label.

3. The information processing apparatus according to claim 2,
wherein the learning unit is further configured to select a network relating to the learning model on the basis of the assigned constraint label.

4. The information processing apparatus according to claim 2,
wherein the learning unit is further configured to select a loss function relating to the learning model on the basis of the assigned constraint label.

5. The information processing apparatus according to claim 1,
wherein the learning unit includes a constraint label estimator configured to estimate the constraint label to be assigned on a basis of the training data.

6. The information processing apparatus according to claim 1,
wherein the training data includes action information of the detection target in time series.

7. The information processing apparatus according to claim 6,
wherein the training data is sensor information relating to an action of the detection target.

8. The information processing apparatus according to claim 1,
wherein the motion label is a label in which an action type of the detection target that follows a physical law is defined.

9. The information processing apparatus according to claim 8, wherein the action type of the detection target that follows the physical law includes at least one of uniform motion, uniformly accelerated motion, or circular motion.

10. The information processing apparatus according to claim 1, wherein the motion label is a label in which a specific action of the detection target is defined.

11. The information processing apparatus according to claim 1,
wherein the motion label is a label in which an action of the detection target associated with specific behavior is defined.

12. The information processing apparatus according to claim 1,
wherein each constraint label is category information relating to classification of time-series data.

13. The information processing apparatus according to claim 1,
wherein the learning unit performs machine learning using the training data grouped for each data sharing the identical constraint.

14. The information processing apparatus according to claim 13,
wherein the grouping is performed for each time-series data relating to an identical specific action of the detection target.

15. The information processing apparatus according to claim 13,
wherein the grouping is performed on a basis of the assigned constraint label and a parameter relating to the constraint.

16. The information processing apparatus according to claim 13,
wherein the grouping is performed by assigning an index to time-series data.

17. An information processing method comprising:
performing, by a processor, machine learning using training data to which a constraint label is assigned from among a plurality of constraint labels,
wherein the training data is a set of frame images in a moving image,
wherein a normal label of the training data includes position information of a detection target in each frame image,
wherein each constraint label is a discrete label in which a type of constraint that continuous values of the normal label follow is defined, and
wherein the assigned constraint label includes a motion label in which an action type of the detection target is defined based on the continuous values of the normal label indicating the position information of the detection target.

18. A non-transitory computer-readable storage medium having embodied thereon a program, which when executed by a computer causes the computer to execute a method, the method comprising:
performing machine learning using training data to which a constraint label is assigned from among a plurality of constraint labels,
wherein the training data is a set of frame images in a moving image,
wherein a normal label of the training data includes position information of a detection target in each frame image,
wherein each constraint label is a discrete label in which a type of constraint that continuous values of the normal label follow is defined, and
wherein the assigned constraint label includes a motion label in which an action type of the detection target is defined based on the continuous values of the normal label indicating the position information of the detection target.

19. The information processing apparatus according to claim 1,
wherein the assigned constraint label relates to a relative position of the detection target between frame images in the moving image.

* * * * *